US012755609B2

(12) United States Patent
Jones et al.

(10) Patent No.: US 12,755,609 B2
(45) Date of Patent: Oct. 6, 2026

(54) GAMING SYSTEM AND METHOD WITH A TARGETED PERSISTENT ELEMENT FEATURE

(71) Applicant: LNW Gaming, Inc., Las Vegas, NV (US)

(72) Inventors: Colbee V. Jones, Reno, NV (US); Dougal Austin, Reno, NV (US); Kellen Dale, Reno, NV (US); Amy Robards, Sparks, NV (US)

(73) Assignee: LNW Gaming, Inc., Las Vegas, NV (US)

( * ) Notice: Subject to any disclaimer, the term of this patent is extended or adjusted under 35 U.S.C. 154(b) by 238 days.

(21) Appl. No.: 18/664,366

(22) Filed: May 15, 2024

(65) Prior Publication Data

US 2024/0420547 A1 Dec. 19, 2024

Related U.S. Application Data

(60) Provisional application No. 63/508,593, filed on Jun. 16, 2023.

(51) Int. Cl.
*G07F 17/32* (2006.01)

(52) U.S. Cl.
CPC ...... *G07F 17/3267* (2013.01); *G07F 17/3213* (2013.01); *G07F 17/3258* (2013.01)

(58) Field of Classification Search
None
See application file for complete search history.

(56) References Cited

U.S. PATENT DOCUMENTS

| | | | |
|---|---|---|---|
| 3,733,075 | A | 5/1973 | Hooker et al. |
| 4,198,052 | A | 4/1980 | Gauselmann |
| 4,732,386 | A | 3/1988 | Rayfiel |
| 5,100,137 | A | 3/1992 | Fulton |
| 5,152,529 | A | 10/1992 | Okada |
| 5,205,555 | A | 4/1993 | Hamano |
| 5,342,047 | A | 8/1994 | Heidel et al. |
| 5,356,140 | A | 10/1994 | Dabrowski et al. |

(Continued)

FOREIGN PATENT DOCUMENTS

| | | | |
|---|---|---|---|
| AU | 2013251288 | A1 | 5/2014 |
| AU | 2014202042 | A1 | 5/2014 |

(Continued)

*Primary Examiner* — Damon J Pierce

(57) ABSTRACT

There are provided a gaming machine and method that utilize game-logic circuitry and a presentation assembly configured to present a plurality of symbol-bearing reels, an array, and a plurality of persistent elements. The plurality of reels are spun and stopped to land symbols in the base array. In response to the landed symbols including at least one accumulation symbol, an animation of addition of the accumulation symbol to one of the plurality of persistent elements is presented. A random determination whether or not to trigger one or more game features is made. Triggered game features are implemented, wherein the implementation includes designating a subset of the positions in the array as associated with each of the triggered game features and conducting a free spin bonus game during which rules associated with each of the triggered game features are applied when certain symbols land in their respective designated locations.

20 Claims, 12 Drawing Sheets

(56) References Cited

U.S. PATENT DOCUMENTS

| | | | |
|---|---|---|---|
| 5,393,061 | A | 2/1995 | Manship et al. |
| 5,395,111 | A | 3/1995 | Inoue |
| 5,431,408 | A | 7/1995 | Adams |
| 5,511,781 | A | 4/1996 | Wood et al. |
| 5,618,232 | A | 4/1997 | Martin |
| 5,695,188 | A | 12/1997 | Ishibashi |
| 5,704,835 | A | 1/1998 | Dietz |
| 5,722,891 | A | 3/1998 | Inoue |
| 5,752,881 | A | 5/1998 | Inoue |
| 5,766,074 | A | 6/1998 | Cannon et al. |
| 5,788,573 | A | 8/1998 | Baerlocher et al. |
| 5,807,177 | A | 9/1998 | Takemoto et al. |
| 5,810,665 | A | 9/1998 | Takemoto et al. |
| 5,833,537 | A | 11/1998 | Barrie |
| 5,848,932 | A | 12/1998 | Adams |
| 5,855,515 | A | 1/1999 | Pease et al. |
| 5,876,284 | A | 3/1999 | Acres et al. |
| 5,882,259 | A | 3/1999 | Holmes, Jr. et al. |
| 5,882,261 | A | 3/1999 | Adams |
| 5,890,962 | A | 4/1999 | Takemoto |
| 5,911,418 | A | 6/1999 | Adams |
| 5,947,820 | A | 9/1999 | Morro et al. |
| 5,951,397 | A | 9/1999 | Dickinson |
| 5,988,638 | A | 11/1999 | Rodesch et al. |
| 6,004,207 | A | 12/1999 | Wilson, Jr. et al. |
| 6,027,115 | A | 2/2000 | Griswold et al. |
| 6,033,307 | A | 3/2000 | Vancura |
| 6,048,269 | A | 4/2000 | Burns et al. |
| 6,050,895 | A | 4/2000 | Luciano, Jr. et al. |
| 6,056,642 | A | 5/2000 | Bennett |
| 6,089,976 | A | 7/2000 | Schneider et al. |
| 6,089,977 | A | 7/2000 | Bennett |
| 6,102,798 | A | 8/2000 | Bennett |
| 6,120,031 | A | 9/2000 | Adams |
| 6,142,873 | A | 11/2000 | Weiss et al. |
| 6,159,097 | A | 12/2000 | Gura |
| 6,162,121 | A | 12/2000 | Morro et al. |
| 6,168,520 | B1 | 1/2001 | Baerlocher et al. |
| 6,186,894 | B1 | 2/2001 | Mayeroff |
| 6,203,429 | B1 | 3/2001 | Demar et al. |
| 6,213,875 | B1 | 4/2001 | Suzuki |
| 6,224,482 | B1 | 5/2001 | Bennett |
| 6,224,483 | B1 | 5/2001 | Mayeroff |
| 6,224,484 | B1 | 5/2001 | Okuda et al. |
| 6,227,971 | B1 | 5/2001 | Weiss |
| 6,241,607 | B1 | 6/2001 | Payne et al. |
| 6,251,013 | B1 | 6/2001 | Bennett |
| 6,270,411 | B1 | 8/2001 | Gura et al. |
| 6,270,412 | B1 | 8/2001 | Crawford et al. |
| 6,290,600 | B1 | 9/2001 | Glasson |
| 6,309,300 | B1 | 10/2001 | Glavich |
| 6,319,124 | B1 | 11/2001 | Baerlocher et al. |
| 6,346,043 | B1 | 2/2002 | Colin et al. |
| 6,364,766 | B1 | 4/2002 | Anderson et al. |
| 6,375,567 | B1 | 4/2002 | Acres |
| 6,375,570 | B1 | 4/2002 | Poole |
| 6,413,162 | B1 | 7/2002 | Baerlocher et al. |
| 6,481,713 | B2 | 11/2002 | Perrie et al. |
| 6,517,432 | B1 | 2/2003 | Jaffe |
| 6,537,150 | B1 | 3/2003 | Luciano et al. |
| 6,544,120 | B2 | 4/2003 | Ainsworth |
| 6,547,242 | B1 | 4/2003 | Sugiyama et al. |
| 6,551,187 | B1 | 4/2003 | Jaffe |
| 6,554,704 | B2 | 4/2003 | Nicastro et al. |
| 6,558,254 | B2 | 5/2003 | Baelocher et al. |
| 6,561,900 | B1 | 5/2003 | Baerlocher et al. |
| 6,561,904 | B2 | 5/2003 | Locke et al. |
| 6,565,434 | B1 | 5/2003 | Acres |
| 6,641,477 | B1 | 11/2003 | Dietz |
| 6,652,378 | B2 | 11/2003 | Cannon et al. |
| 6,656,040 | B1 | 12/2003 | Brosnan et al. |
| 6,657,923 | B2 | 12/2003 | Laughlin |
| 6,692,356 | B2 | 2/2004 | Baerlocher et al. |
| 6,702,675 | B2 | 3/2004 | Poole et al. |
| 6,731,313 | B1 | 5/2004 | Kaminkow |
| 6,749,502 | B2 | 6/2004 | Baerlocher |
| 6,786,818 | B1 | 9/2004 | Rothschild et al. |
| 6,832,957 | B2 | 12/2004 | Falconer |
| 6,837,790 | B1 | 1/2005 | Kaminkow |
| 6,855,053 | B2 | 2/2005 | Baerlocher |
| 6,869,360 | B2 | 3/2005 | Marks et al. |
| 6,878,061 | B2 | 4/2005 | Baerlocher et al. |
| 6,896,617 | B2 | 5/2005 | Daly |
| 6,910,962 | B2 | 6/2005 | Marks et al. |
| 6,916,243 | B2 | 7/2005 | Yoshida |
| 6,918,834 | B2 | 7/2005 | Vancura |
| 6,921,334 | B1 | 7/2005 | Bennett |
| 6,926,609 | B2 | 8/2005 | Martin |
| 6,960,134 | B2 | 11/2005 | Hartl et al. |
| 6,964,416 | B2 | 11/2005 | Mcclintic et al. |
| 7,018,293 | B2 | 3/2006 | Brown et al. |
| 7,029,395 | B1 | 4/2006 | Baerlocher |
| 7,029,396 | B2 | 4/2006 | Jaffe et al. |
| 7,065,215 | B2 | 6/2006 | Shirakawa et al. |
| 7,112,136 | B2 | 9/2006 | Anderson et al. |
| 7,121,945 | B2 | 10/2006 | Suganuma et al. |
| 7,137,886 | B2 | 11/2006 | Locke et al. |
| 7,147,559 | B2 | 12/2006 | Englman |
| 7,156,740 | B2 | 1/2007 | Kaminkow |
| 7,179,169 | B2 | 2/2007 | Beaulieu et al. |
| 7,252,591 | B2 | 8/2007 | Van Asdale |
| 7,294,055 | B2 | 11/2007 | Baerlocher et al. |
| 7,316,613 | B2 | 1/2008 | Luccesi et al. |
| 7,371,170 | B2 | 5/2008 | Cregan et al. |
| 7,377,850 | B2 | 5/2008 | Shackelford et al. |
| 7,431,646 | B2 | 10/2008 | Jackson |
| 7,452,276 | B2 | 11/2008 | Loose et al. |
| 7,458,890 | B2 | 12/2008 | Loose et al. |
| 7,488,252 | B2 | 2/2009 | Griswold et al. |
| 7,494,412 | B2 | 2/2009 | Baerlocher |
| 7,503,847 | B2 | 3/2009 | Baerlocher |
| 7,526,736 | B2 | 4/2009 | Kaminkow et al. |
| 7,553,231 | B2 | 6/2009 | Rodgers et al. |
| 7,578,735 | B2 | 8/2009 | Frizzell et al. |
| 7,601,062 | B2 | 10/2009 | Cole et al. |
| 7,604,538 | B2 | 10/2009 | Pacey |
| 7,618,319 | B2 | 11/2009 | Casey et al. |
| 7,625,278 | B2 | 12/2009 | Paulsen et al. |
| 7,628,690 | B2 | 12/2009 | Englman et al. |
| 7,631,872 | B2 | 12/2009 | Roemer et al. |
| 7,654,895 | B2 | 2/2010 | Pacey |
| 7,654,899 | B2 | 2/2010 | Durham et al. |
| 7,699,699 | B2 | 4/2010 | Gilliland et al. |
| 7,704,141 | B1 | 4/2010 | Marks et al. |
| 7,744,460 | B2 | 6/2010 | Walker et al. |
| 7,785,191 | B2 | 8/2010 | Marks et al. |
| 7,789,744 | B2 | 9/2010 | Fiden |
| 7,841,934 | B2 | 11/2010 | Gauselmann |
| 7,980,936 | B2 | 7/2011 | Mead |
| 8,021,223 | B2 | 9/2011 | Rose |
| 8,021,225 | B2 | 9/2011 | Okada |
| 8,066,563 | B1 | 11/2011 | Schultz et al. |
| 8,083,581 | B2 | 12/2011 | Marks et al. |
| 8,105,145 | B2 | 1/2012 | Jaffe |
| 8,105,151 | B2 | 1/2012 | Caputo et al. |
| 8,113,940 | B2 | 2/2012 | Hornik |
| 8,147,322 | B2 | 4/2012 | Walker et al. |
| 8,162,740 | B2 | 4/2012 | Aoki |
| 8,162,741 | B2 | 4/2012 | Wadleigh et al. |
| 8,192,275 | B2 | 6/2012 | Aoki et al. |
| 8,246,442 | B1 | 8/2012 | Barrie |
| 8,272,938 | B2 | 9/2012 | Gilmore et al. |
| 8,287,357 | B2 | 10/2012 | Evans |
| 8,323,091 | B2 | 12/2012 | Frank et al. |
| 8,357,041 | B1 | 1/2013 | Saunders |
| 8,360,851 | B2 | 1/2013 | Aoki et al. |
| 8,366,538 | B1 | 2/2013 | Saunders et al. |
| 8,371,930 | B1 | 2/2013 | Saunders et al. |
| 8,388,432 | B2 | 3/2013 | Mattice et al. |
| 8,414,380 | B2 | 4/2013 | Saunders et al. |
| 8,465,358 | B2 | 6/2013 | Kemper |
| 8,480,473 | B2 | 7/2013 | Villejo et al. |
| 8,496,522 | B2 | 7/2013 | Caputo et al. |
| 8,512,121 | B2 | 8/2013 | Macvittie et al. |

(56) References Cited

U.S. PATENT DOCUMENTS

| | | | |
|---|---|---|---|
| 8,512,124 | B2 | 8/2013 | Bramble et al. |
| 8,512,138 | B2 | 8/2013 | Saunders |
| 8,523,659 | B2 | 9/2013 | Evans |
| 8,574,059 | B2 | 11/2013 | Rodgers et al. |
| 8,602,868 | B2 | 12/2013 | Johnson et al. |
| 8,608,545 | B2 | 12/2013 | Arora et al. |
| 8,662,986 | B2 | 3/2014 | Rodgers et al. |
| 8,678,908 | B2 | 3/2014 | Nicely |
| 8,690,660 | B2 | 4/2014 | Saunders et al. |
| 8,696,434 | B2 | 4/2014 | Tsukahara |
| 8,702,487 | B2 | 4/2014 | Thomas |
| 8,771,054 | B2 | 7/2014 | Aoki et al. |
| 8,790,169 | B2 | 7/2014 | Saunders |
| 8,795,059 | B2 | 8/2014 | Aoki et al. |
| 8,821,254 | B2 | 9/2014 | Tsukahara |
| 8,834,258 | B2 | 9/2014 | Gobe et al. |
| 8,851,974 | B2 | 10/2014 | Caputo et al. |
| 8,870,642 | B2 | 10/2014 | Leupp et al. |
| 8,882,578 | B2 | 11/2014 | Saunders |
| 8,961,291 | B2 | 2/2015 | Dias Pires et al. |
| 9,005,022 | B2 | 4/2015 | Saunders |
| 9,011,233 | B2 | 4/2015 | Ryan |
| 9,098,847 | B2 | 8/2015 | Basallo et al. |
| 9,098,973 | B2 | 8/2015 | Basallo et al. |
| 9,147,321 | B2 | 9/2015 | Moody |
| 9,165,433 | B2 | 10/2015 | Caputo |
| 9,177,447 | B2 | 11/2015 | Zoltewicz et al. |
| 9,202,345 | B2 | 12/2015 | Zoltewicz et al. |
| 9,214,011 | B2 | 12/2015 | Wei et al. |
| 9,230,410 | B2 | 1/2016 | Saunders et al. |
| 9,245,421 | B2 | 1/2016 | Saunders et al. |
| 9,251,667 | B2 | 2/2016 | Marks et al. |
| 9,257,017 | B2 | 2/2016 | Saunders et al. |
| 9,262,895 | B2 | 2/2016 | Rodgers et al. |
| 9,275,524 | B2 | 3/2016 | Nicely |
| 9,299,224 | B2 | 3/2016 | Leupp |
| 9,311,781 | B2 | 4/2016 | Edwards |
| 9,349,251 | B2 | 5/2016 | Caputo et al. |
| 9,355,528 | B2 | 5/2016 | Nicely |
| 9,418,521 | B1 | 8/2016 | Henrick et al. |
| 9,424,720 | B2 | 8/2016 | Suda |
| 9,430,900 | B2 | 8/2016 | Zoltewicz et al. |
| 9,466,169 | B2 | 10/2016 | Basallo et al. |
| 9,474,972 | B2 | 10/2016 | Lenger |
| 9,495,839 | B2 | 11/2016 | Aoki et al. |
| 9,595,157 | B2 | 3/2017 | Rasmussen et al. |
| 9,633,506 | B2 | 4/2017 | Basallo et al. |
| 9,704,342 | B2 | 7/2017 | Aoki et al. |
| 9,928,691 | B2 | 3/2018 | Olive |
| 10,013,855 | B2 | 7/2018 | Nakamura |
| 10,037,651 | B2 | 7/2018 | You et al. |
| 10,043,350 | B2 | 8/2018 | Gomez et al. |
| 10,062,237 | B2 | 8/2018 | Devine et al. |
| 10,204,473 | B2 | 2/2019 | Lenger |
| 10,242,533 | B2 | 3/2019 | Okada et al. |
| 10,339,761 | B2 | 7/2019 | Olive |
| 10,366,575 | B2 | 7/2019 | Visser |
| 10,388,112 | B2 | 8/2019 | You et al. |
| 10,410,472 | B2 | 9/2019 | Moody |
| 10,417,877 | B2 | 9/2019 | Gomez et al. |
| 10,475,294 | B2 | 11/2019 | Gomez et al. |
| 10,497,203 | B2 | 12/2019 | Elmqvist |
| 10,672,220 | B2 | 6/2020 | Lenger |
| 10,706,664 | B2 | 7/2020 | Boese et al. |
| 10,726,676 | B2 | 7/2020 | You et al. |
| 10,769,888 | B2 | 9/2020 | You et al. |
| 10,839,648 | B2 | 11/2020 | Okada et al. |
| 10,957,161 | B2 | 3/2021 | Chesworth et al. |
| 11,017,638 | B2 | 5/2021 | Chesworth et al. |
| 2001/0021666 | A1 | 9/2001 | Yoshida et al. |
| 2002/0016200 | A1 | 2/2002 | Baerlocher et al. |
| 2002/0045474 | A1 | 4/2002 | Singer et al. |
| 2002/0119818 | A1 | 8/2002 | Savio et al. |
| 2002/0155881 | A1 | 10/2002 | Yoshida |
| 2002/0183105 | A1 | 12/2002 | Cannon et al. |
| 2003/0017865 | A1 | 1/2003 | Beaulieu et al. |
| 2003/0027619 | A1 | 2/2003 | Nicastro, Sr. |
| 2003/0035346 | A1 | 2/2003 | Laughlin |
| 2003/0064782 | A1 | 4/2003 | Beaulieu et al. |
| 2003/0064801 | A1 | 4/2003 | Breckner et al. |
| 2003/0064802 | A1 | 4/2003 | Rodgers et al. |
| 2003/0069063 | A1 | 4/2003 | Bilyeu et al. |
| 2003/0130034 | A1 | 7/2003 | Suganuma et al. |
| 2003/0157980 | A1 | 8/2003 | Loose et al. |
| 2003/0216165 | A1 | 11/2003 | Singer et al. |
| 2004/0012145 | A1 | 1/2004 | Inoue |
| 2004/0023714 | A1 | 2/2004 | Asdale |
| 2004/0043815 | A1 | 3/2004 | Kaminkow |
| 2004/0048646 | A1 | 3/2004 | Visocnik |
| 2004/0092315 | A1 | 5/2004 | Boyd et al. |
| 2004/0137982 | A1 | 7/2004 | Cuddy et al. |
| 2004/0171417 | A1 | 9/2004 | Beaulieu et al. |
| 2004/0198489 | A1 | 10/2004 | Kaminkow et al. |
| 2005/0054442 | A1 | 3/2005 | Anderson et al. |
| 2005/0130731 | A1 | 6/2005 | Englman et al. |
| 2005/0159208 | A1 | 7/2005 | Pacey |
| 2006/0009286 | A1 | 1/2006 | Durham et al. |
| 2006/0063588 | A1 | 3/2006 | Poole |
| 2006/0111173 | A1 | 5/2006 | Yang |
| 2006/0142080 | A1 | 6/2006 | Enzminger |
| 2006/0189369 | A1 | 8/2006 | Taylor |
| 2006/0205469 | A1 | 9/2006 | Schultz et al. |
| 2006/0247002 | A1 | 11/2006 | Yoshimi et al. |
| 2007/0060248 | A1 | 3/2007 | Rodgers et al. |
| 2007/0060255 | A1 | 3/2007 | Baerlocher et al. |
| 2007/0060275 | A1 | 3/2007 | Gilmore et al. |
| 2007/0129135 | A1 | 6/2007 | Marks et al. |
| 2007/0149267 | A1 | 6/2007 | Ross et al. |
| 2007/0281784 | A1 | 12/2007 | Seelig et al. |
| 2007/0287529 | A1 | 12/2007 | Kojima |
| 2008/0003278 | A1 | 1/2008 | Mondelo |
| 2008/0004532 | A1 | 1/2008 | Rubey et al. |
| 2008/0032784 | A1 | 2/2008 | Englman |
| 2008/0045298 | A1 | 2/2008 | Yoshizawa |
| 2008/0045320 | A1 | 2/2008 | Kato |
| 2008/0108408 | A1 | 5/2008 | Wolf |
| 2008/0108411 | A1 | 5/2008 | Jensen et al. |
| 2008/0108422 | A1 | 5/2008 | Hedrick et al. |
| 2008/0108431 | A1 | 5/2008 | Cuddy et al. |
| 2008/0132321 | A1 | 6/2008 | Pau |
| 2008/0182647 | A1 | 7/2008 | Brunet De Courssou et al. |
| 2008/0274789 | A1 | 11/2008 | Singer et al. |
| 2009/0036208 | A1 | 2/2009 | Pennington et al. |
| 2009/0156287 | A1 | 6/2009 | Baumgartner |
| 2009/0181755 | A1 | 7/2009 | Gagner et al. |
| 2009/0239634 | A1 | 9/2009 | Nguyen |
| 2009/0291741 | A1 | 11/2009 | Schofield |
| 2010/0075737 | A1 | 3/2010 | Bluemel |
| 2010/0113133 | A1 | 5/2010 | Leupp |
| 2010/0167815 | A1 | 7/2010 | Gagner et al. |
| 2010/0203948 | A1 | 8/2010 | Falciglia, Sr. |
| 2010/0210343 | A1 | 8/2010 | Englman et al. |
| 2010/0234092 | A1 | 9/2010 | Gomez et al. |
| 2010/0304832 | A1 | 12/2010 | Kup-Ferroth |
| 2011/0244943 | A1 | 10/2011 | Milford et al. |
| 2011/0300937 | A1 | 12/2011 | Crowder, Jr. et al. |
| 2012/0015707 | A1 | 1/2012 | Hornik et al. |
| 2012/0034965 | A1 | 2/2012 | Masen et al. |
| 2012/0077564 | A1 | 3/2012 | Collette et al. |
| 2012/0094738 | A1 | 4/2012 | Aoki et al. |
| 2012/0122532 | A1 | 5/2012 | Berman et al. |
| 2012/0178517 | A1 | 7/2012 | Montenegro et al. |
| 2012/0220360 | A1 | 8/2012 | Mcallister et al. |
| 2013/0053124 | A1 | 2/2013 | Masen et al. |
| 2013/0065663 | A1 | 3/2013 | Johnson et al. |
| 2013/0102375 | A1 | 4/2013 | Aoki et al. |
| 2013/0252704 | A1 | 9/2013 | Gilbertson et al. |
| 2013/0260861 | A1 | 10/2013 | Vann et al. |
| 2013/0324217 | A1 | 12/2013 | Gilbertson et al. |
| 2014/0014186 | A1 | 1/2014 | Bhattacharya et al. |
| 2014/0024429 | A1 | 1/2014 | Aoki et al. |
| 2014/0051496 | A1 | 2/2014 | Meyer |
| 2014/0141860 | A1 | 5/2014 | Meyer |
| 2014/0179396 | A1 | 6/2014 | Aoki et al. |

(56) References Cited

U.S. PATENT DOCUMENTS

| | | | | |
|---|---|---|---|---|
| 2014/0274292 | A1 | 9/2014 | Suda | |
| 2014/0323198 | A1 | 10/2014 | Tuck | |
| 2015/0031437 | A1 | 1/2015 | Gomez et al. | |
| 2015/0170462 | A1 | 6/2015 | Berman et al. | |
| 2015/0206386 | A1 | 7/2015 | Jaffe et al. | |
| 2015/0269809 | A1 | 9/2015 | Smith | |
| 2015/0287269 | A1 | 10/2015 | Berman | |
| 2015/0356833 | A1 | 12/2015 | Aoki et al. | |
| 2015/0379831 | A1 | 12/2015 | Lee et al. | |
| 2016/0042597 | A1 | 2/2016 | Olive | |
| 2016/0155303 | A1 | 6/2016 | Aoki et al. | |
| 2017/0154498 | A1 | 6/2017 | Olive | |
| 2017/0372558 | A1 | 12/2017 | You et al. | |
| 2018/0130303 | A1 | 5/2018 | Lamb | |
| 2018/0268655 | A1 | 9/2018 | Olive | |
| 2018/0268659 | A1 | 9/2018 | Chesworth et al. | |
| 2019/0051097 | A1 | 2/2019 | Marks et al. | |
| 2019/0102992 | A1 | 4/2019 | You et al. | |
| 2019/0236905 | A1 | 8/2019 | Washington et al. | |
| 2021/0082248 | A1* | 3/2021 | Guerrero | G07F 17/3213 |
| 2021/0350678 | A1* | 11/2021 | Warms | G07F 17/3213 |
| 2023/0099795 | A1* | 3/2023 | Hendricks | G07F 17/3213 463/31 |
| 2024/0177567 | A1* | 5/2024 | Hornik | G07F 17/3244 |

FOREIGN PATENT DOCUMENTS

| | | | |
|---|---|---|---|
| AU | 2015210489 | A1 | 2/2016 |
| GB | 2097160 | A | 10/1982 |
| GB | 2097160 | B | 5/1984 |
| GB | 2144568 | A | 3/1985 |
| GB | 2144568 | B | 9/1985 |
| GB | 2251112 | A | 6/1992 |

* cited by examiner

GAMING SYSTEM AND METHOD WITH A TARGETED PERSISTENT ELEMENT FEATURE

CROSS-REFERENCE TO RELATED APPLICATION(S)

This patent application claims priority benefit of U.S. Provisional Patent Application No. 63/508,593 filed Jun. 16, 2023. The disclosure of the 63/508,593 Application is incorporated herein by reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2023-2024, LNW Gaming, Inc.

FIELD OF THE INVENTION

The present invention relates to a technological improvement to gaming systems, gaming machines, and methods and, more particularly, to technological improvements in connection with a persistent element feature.

BACKGROUND OF THE INVENTION

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation. As the industry matures, the creativity and ingenuity required to improve such operation of gaming apparatus and games grows accordingly.

Another significant technical challenge is to improve the operation of gaming apparatus and games played thereon by increasing processing speed and efficiency of usage of processing and/or memory resources. To make games more entertaining and exciting, they often offer the complexities of advanced graphics and special effects, multiple game features with different game formats, and multiple random outcome determinations per feature. The game formats may, for example, include picking games, reel spins, wheel spins, and other arcade-style play mechanics. Inefficiencies in processor execution of the game software can slow down play of the game and prevent a player from playing the game at their desired pace.

Yet another significant technical challenge is to provide a new and improved level of game play that uses new and improved gaming apparatus animations. Improved animations represent improvements to the underlying technology or technical field of gaming apparatus and, at the same time, have the effect of encouraging prolonged and frequent player participation.

SUMMARY OF THE INVENTION

There are provided a gaming machine and method that utilize game-logic circuitry and a presentation assembly configured to present a plurality of symbol-bearing reels, an array, and a plurality of persistent elements. The plurality of reels are spun and stopped to land symbols in the base array. In response to the landed symbols including at least one accumulation symbol, an animation of addition of the accumulation symbol to one of the plurality of persistent elements is presented. A random determination whether or not to trigger one or more game features is made. Triggered game features are implemented via the game-logic circuitry and the presentation assembly, wherein the implementation includes designating a subset of the positions in the array as associated with each of the triggered game features and conducting a free spin bonus game during which rules associated with each of the triggered game features are applied when certain symbols land in their respective designated locations.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

FIG. 3A relates to a base-game portion of a wagering game; FIG. 3B relates to the awarding of one or more game features and FIG. 3C relates to a bonus game that may be triggered as a result of the awarding of the game features.

Figure 1:
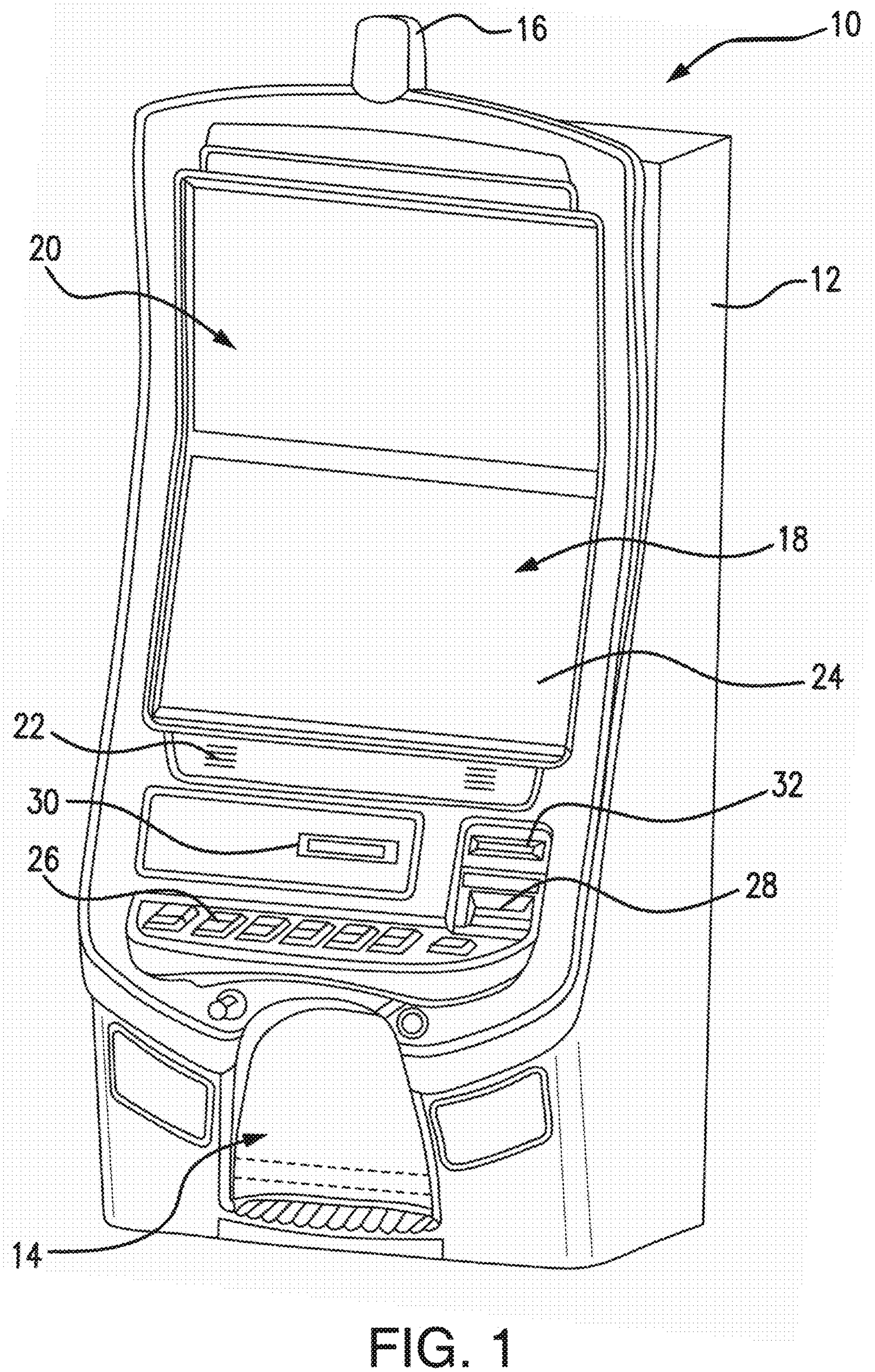
FIG. 1 is a front view of a free-standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls, and shelves for mounting the internal components and managing the wiring, and one or more front doors that are locked and require a physical or electronic key to gain access to the interior compartment of the cabinet 12 behind the locked door. The cabinet 12 forms an alcove 14 configured to store one or more beverages or personal items of a player. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary presentation device 18, a secondary presentation device 20, and one or more audio speakers 22. The primary presentation device 18 or the secondary presentation device 20 may be a mechanical-reel display device, a video display device, or a combination thereof. In one such combination disclosed in U.S. Pat. No. 6,517,433, a transmissive video display is disposed in front of the mechanical reel display to portray a video image superimposed upon electro-mechanical reels. In another combination disclosed in U.S. Pat. No. 7,654,899, a projector projects video images onto stationary or moving surfaces. In yet another combination disclosed in U.S. Pat. No. 7,452,276, miniature video displays are mounted to electro-mechanical reels and portray video symbols for the game. In a further combination disclosed in U.S. Pat. No. 8,591,330, flexible displays such as OLED or e-paper displays are affixed to electro-mechanical reels. The aforementioned U.S. Pat. Nos. 6,517,433, 7,654,899, 7,452,276, and 8,591,330 are incorporated herein by reference in their entireties.

The presentation devices 18, 20, the audio speakers 22, lighting assemblies, and/or other devices associated with presentation are collectively referred to as a "presentation assembly" of the gaming machine 10. The presentation assembly may include one presentation device (e.g., the primary presentation device 18), some of the presentation devices of the gaming machine 10, or all of the presentation devices of the gaming machine 10. The presentation assembly may be configured to present a unified presentation sequence formed by visual, audio, tactile, and/or other suitable presentation means, or the devices of the presentation assembly may be configured to present respective presentation sequences or respective information.

The presentation assembly, and more particularly the primary presentation device 18 and/or the secondary presentation device 20, variously presents information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 may include a touch screen(s) 24 mounted over the primary or secondary presentation devices, buttons 26 on a button panel, a bill/ticket acceptor 28, a card reader/writer 30, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the "credits" meter 200 (see FIG. 4). The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. In response to a cashout input that initiates a payout from the credit balance on the "credits" meter 200 (see FIG. 4), the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
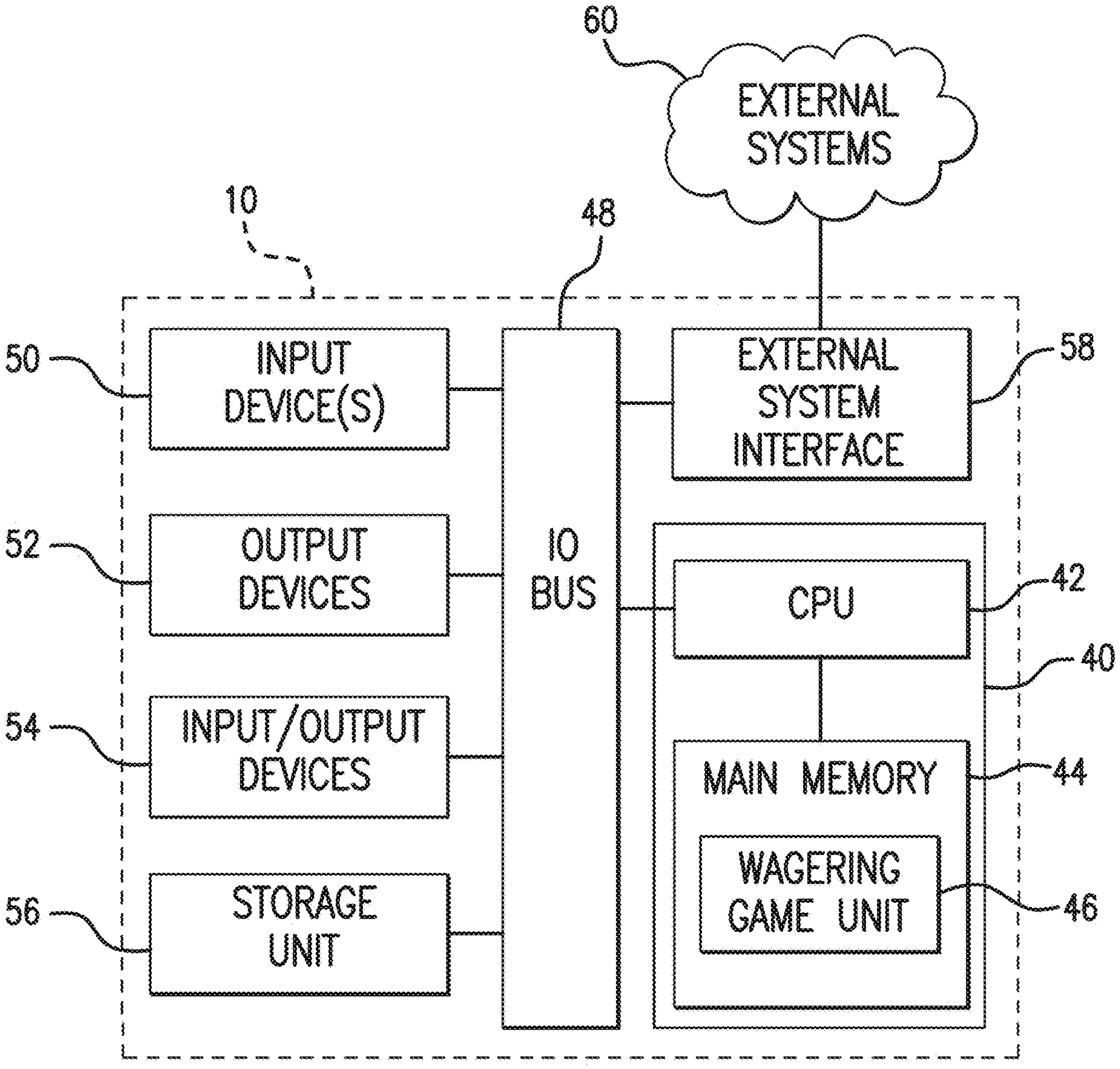
FIG. 2 is a block diagram of a gaming system according to an embodiment of the present invention.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video blackjack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

In accordance with various methods of conducting a wagering game on a gaming system in accord with the present concepts, the wagering game includes a game sequence in which a player makes a wager, and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary presentation device 18 or secondary presentation device 20) through the presentation of information such as, but not limited to, text, graphics, static images, moving images, etc., or any combination thereof. In accord with the method of conducting the wagering game, the game-logic circuitry 40 transforms a physical player input, such as a player's pressing of a "Spin" touch key or button, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary presentation device 18, other presentation device, or other output device (e.g., speakers, lights, communication device, etc.) to change from a first state to at least a second state, wherein the second state of the primary presentation device comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in or are used in other gaming jurisdictions, including for example GLI Standard #11 of Gaming Laboratories International (which defines a gaming device in Section 1.5) and N.J.S.A 5:12-23, 5:12-45, and all other relevant provisions of the New Jersey Casino Control Act. As can be seen from the description herein, the gaming machine 10 may be regulatorily approved and thus implemented with hardware and software architectures, circuitry, and other special features that differentiate it from general-purpose computers (e.g., desktop PCs, laptops, and tablets).

Figure 3A:
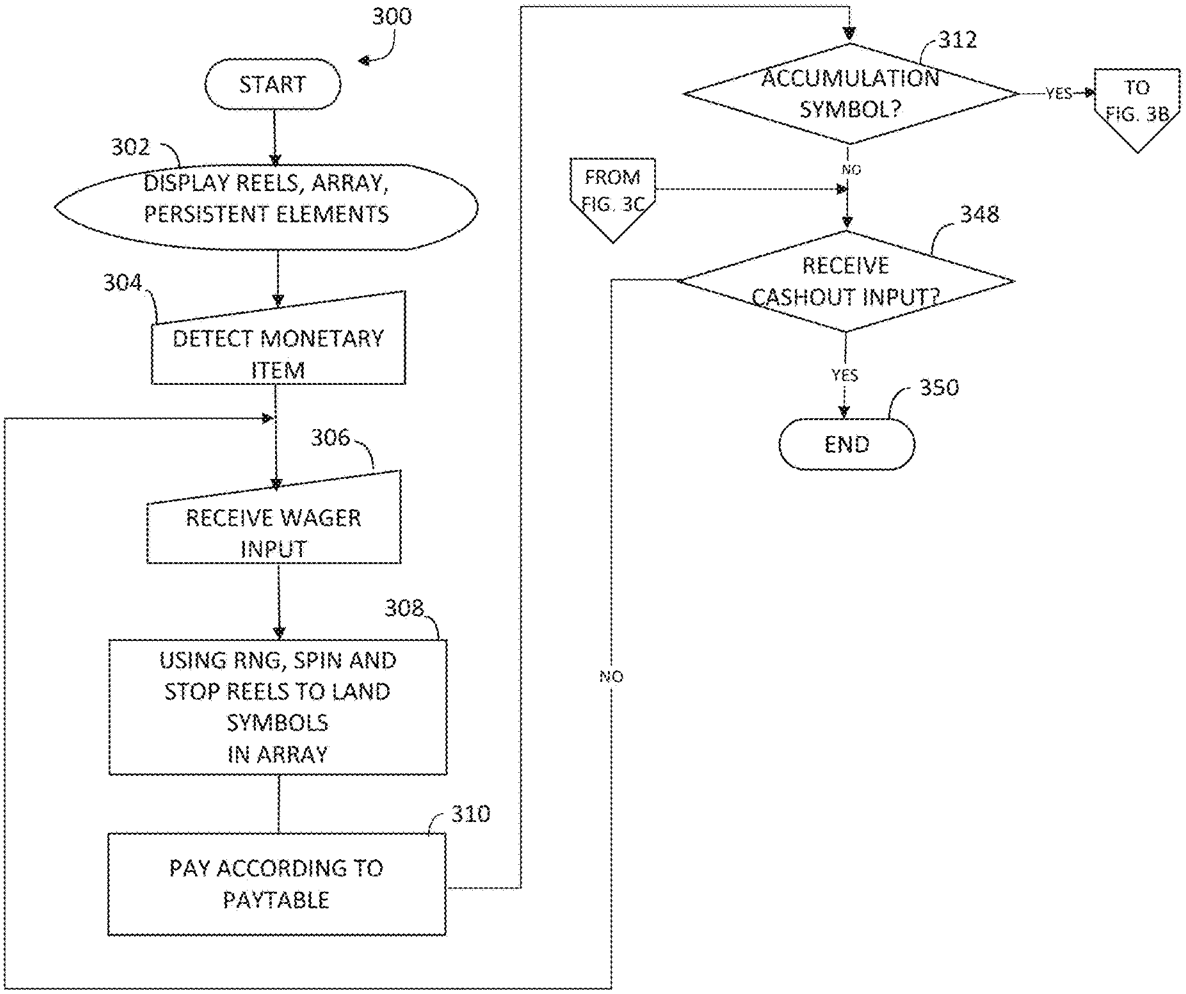
FIGS. 3A, 3B and 3C are a flow diagram for a data processing method that corresponds to instructions executed by a controller, according to an embodiment of the present invention.
Figure 3B:
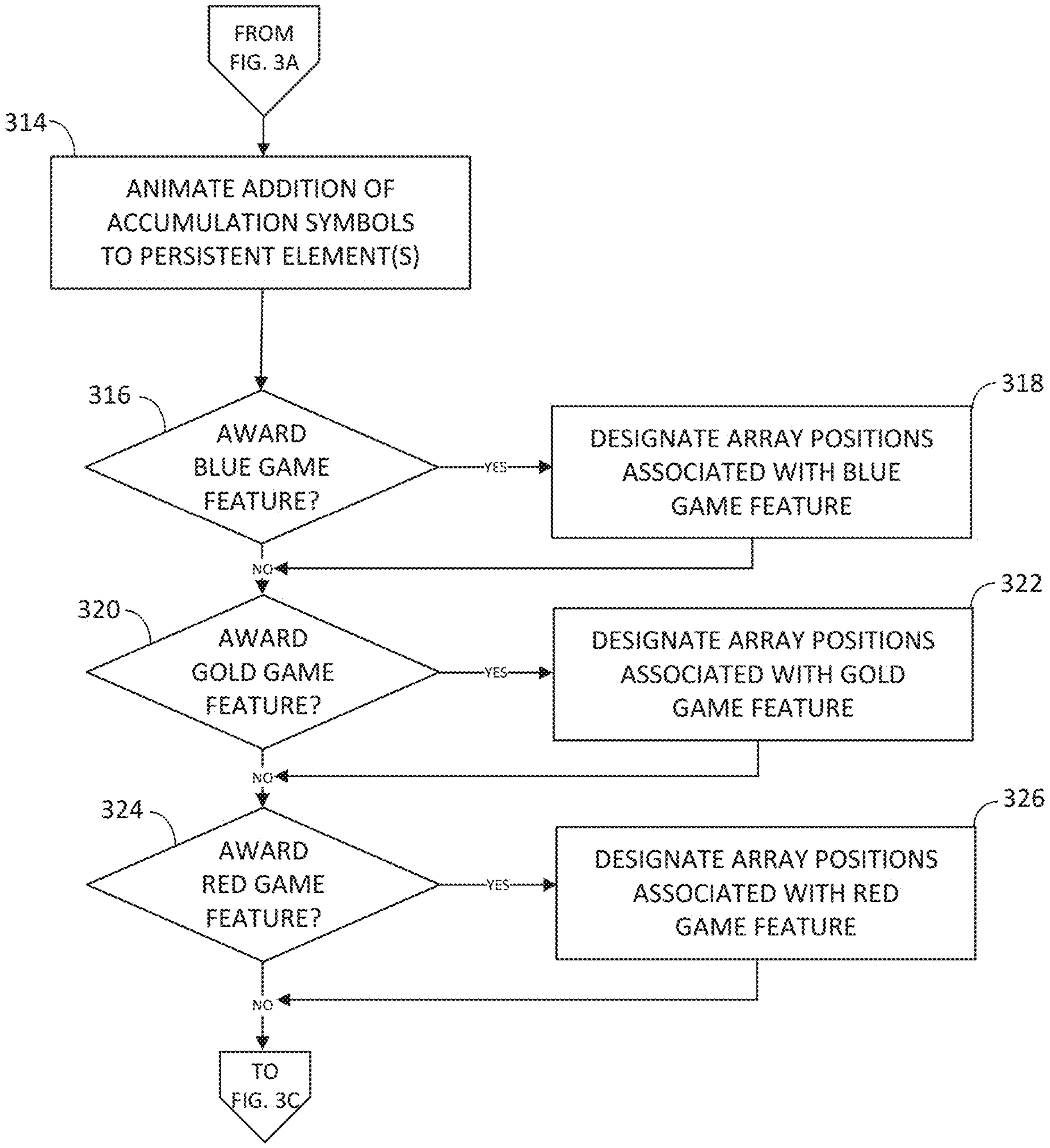
Figure 3C:
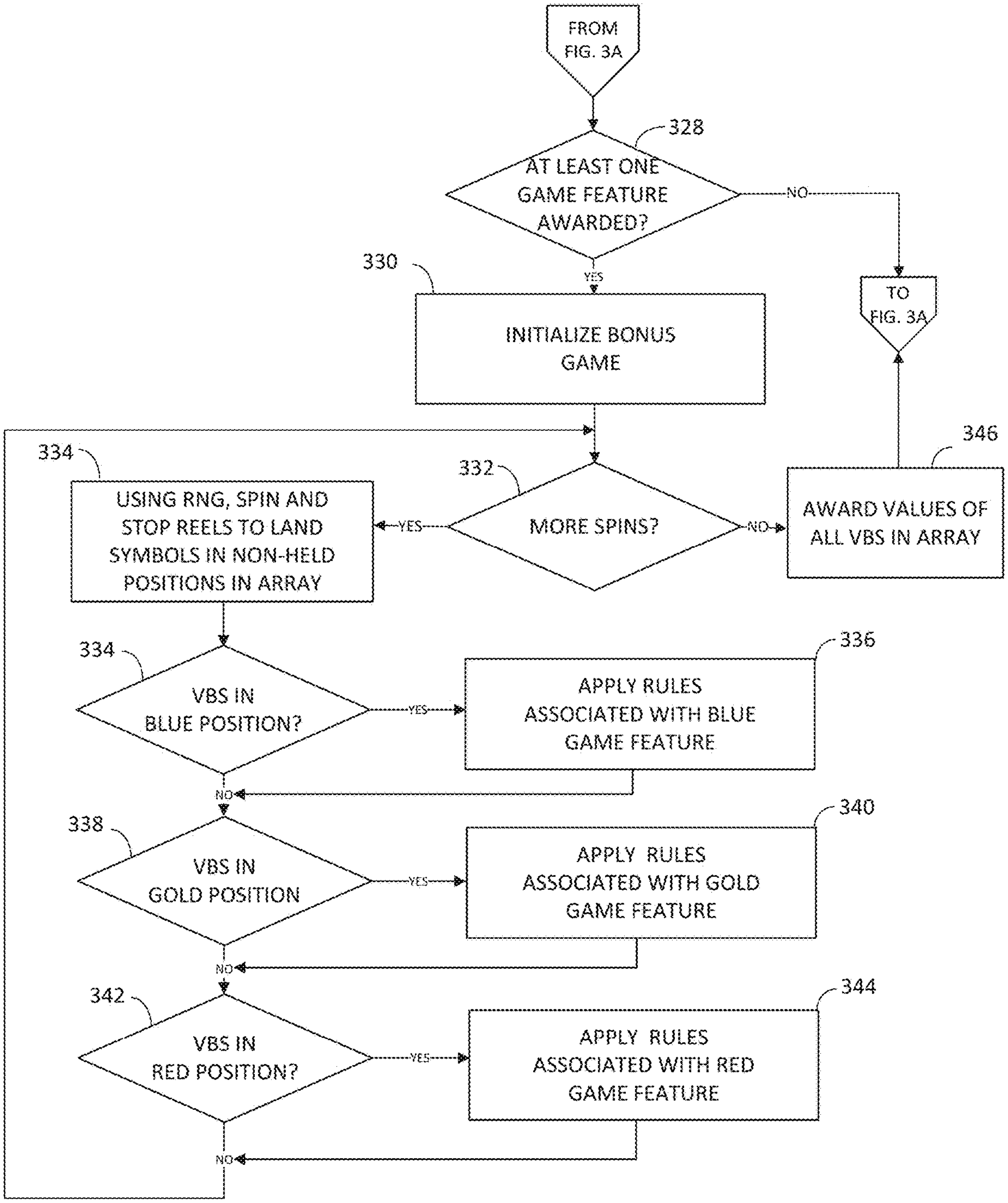

Referring now to FIGS. 3A-3C, there is shown a flow diagram representing one data processing method corresponding to at least some instructions stored and executed by the game-logic circuitry 40 in FIG. 2 to perform operations according to an embodiment of the present invention. The data processing method is described below in connection with the exemplary presentations of different spin outcomes in FIGS. 4-10.

Game Play Initiation

Referring to FIG. 3A, the data processing method commences at step 300. At step 302, the game-logic circuitry controls one or more presentation devices (e.g., mechanical-reel display device, video display device, or a combination thereof) to present a plurality of symbol-bearing reels, an array of symbol positions, and a plurality of persistent elements. Although the method is described with respect to one presentation device, it is to be understood that the presentation described herein may be performed by a presentation assembly including more than one presentation device. The symbol positions of the array may be arranged in a variety of configurations, formats, or structures and may comprise a plurality of rows and columns. The rows of the array are oriented in a generally horizontal direction, and the columns of the array are oriented in a generally vertical direction. The symbol positions in each row of the array are horizontally aligned with each other, and the symbol positions in each column of the array are vertically aligned with each other. Alternatively, the symbol positions may be arranged in a honeycomb configuration with adjacent columns vertically offset from each other by one-half symbol position or adjacent rows horizontally offset from each other by one-half symbol position. The number of symbol positions in different rows and/or different columns may vary from each other. The reels may be associated with the respective columns of the array such that the reels spin vertically, and each reel populates a respective column. In another embodiment, the reels may be associated with the respective rows of the array such that the reels spin horizontally, and each reel populates a respective row. In some embodiments, the reels are associated with respective individual symbol positions of the array such that each reel animates in place and populates only its respective symbol position. The symbol array configuration may vary between the base game and any bonus games utilizing the array.

Figure 4:
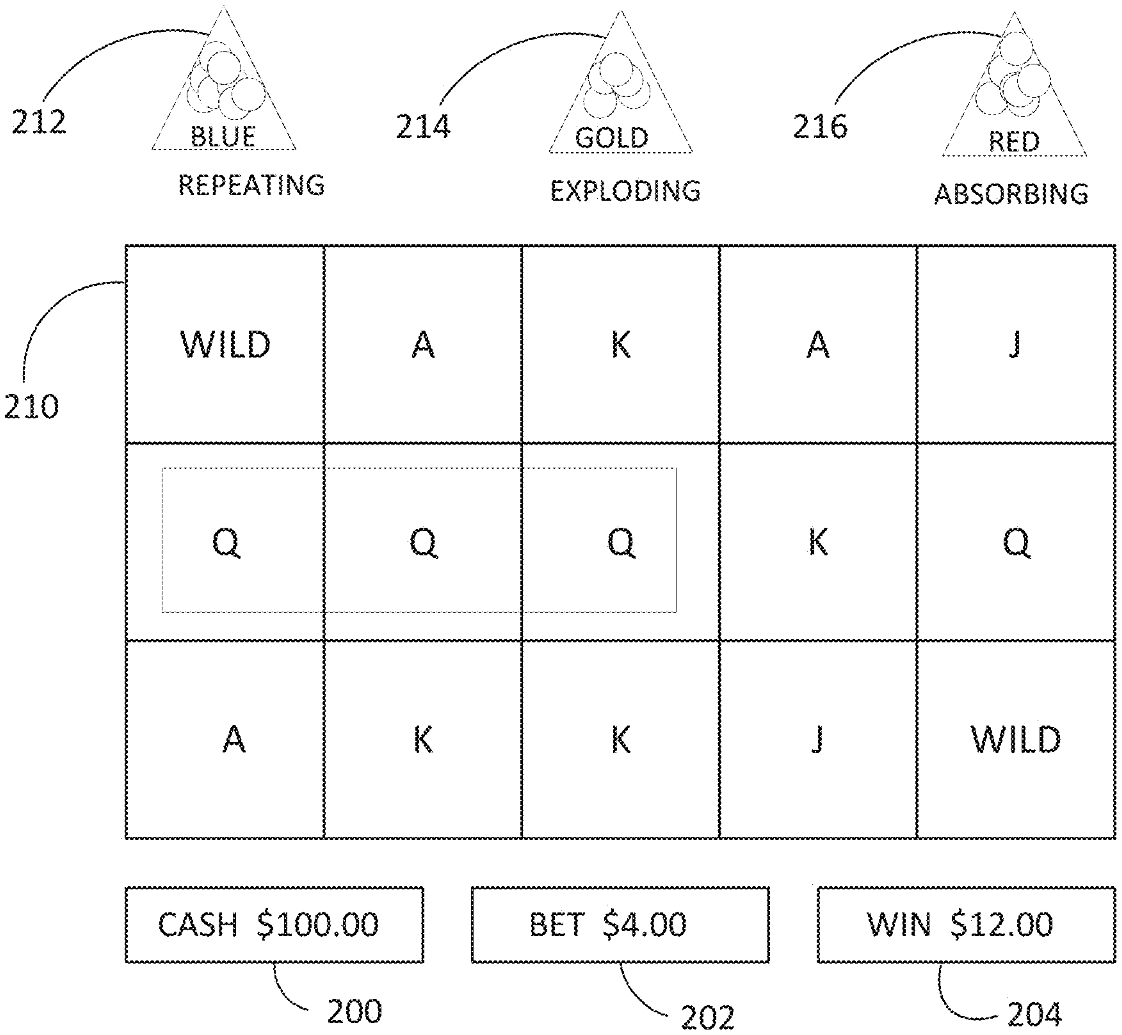
FIGS. 4-6 are exemplary presentations of base-game spin outcomes resulting from the flow diagram in FIG. 3A in accordance with one or more embodiments.
Figure 5:
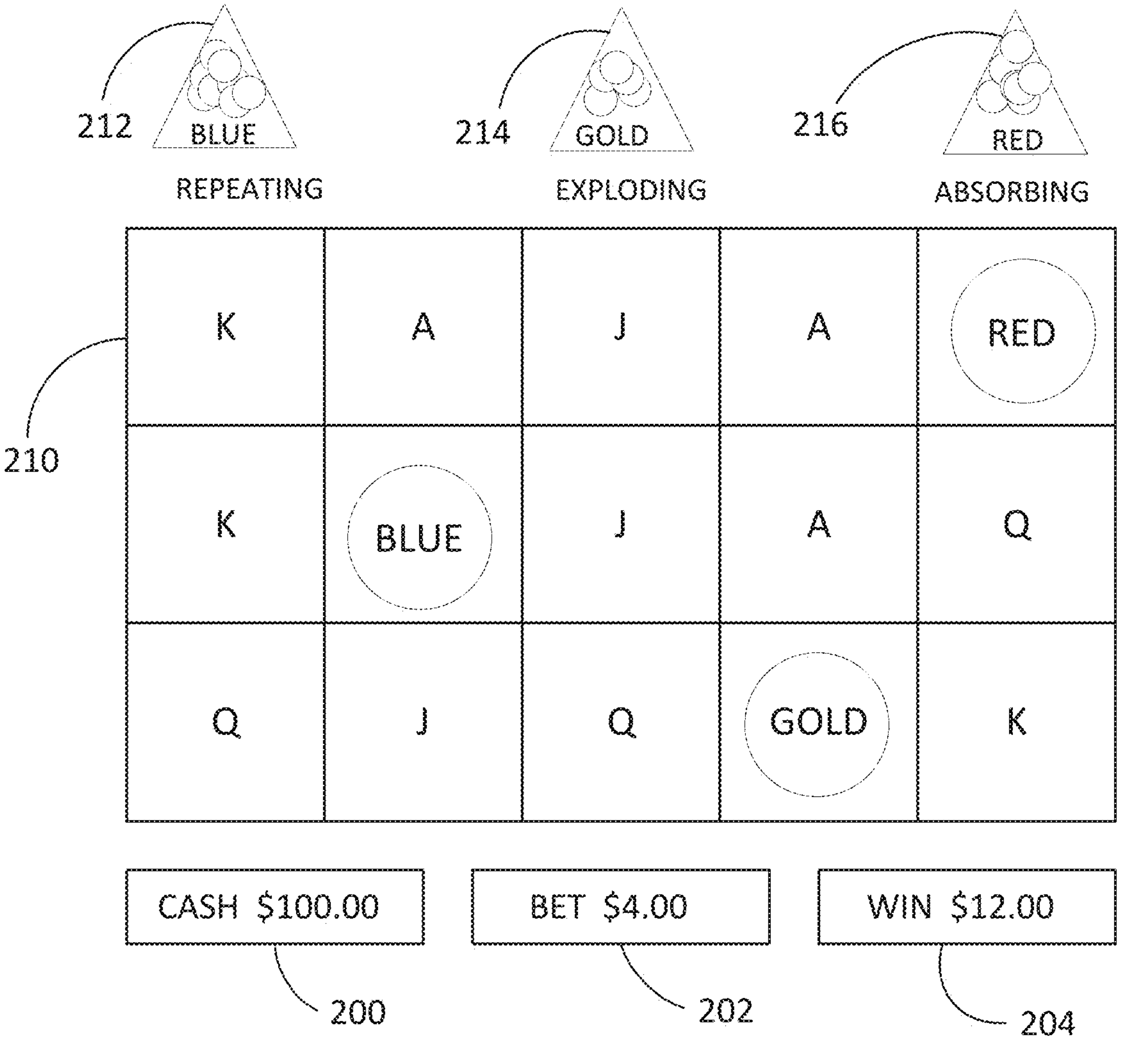

Referring to FIGS. 4-5, which illustrate examples of the display at the conclusion of a first and a second representative base game spin, respectively, the symbol array 210 in the base game has a three-by-five rectangular configuration, and each symbol position is associated with a respective independent reel. The reels bear a plurality of symbols that may, for example, include various base game symbols J, Q, K, A and a WILD symbol that can substitute for any of the base game symbols, as shown in FIG. 4.

Though not shown in FIG. 4, FIG. 5 illustrates that the plurality of symbols may also include accumulation symbols in the form of BLUE, GOLD and RED colored or labeled coin symbols represented by circles. Players hope to land the BLUE, GOLD or RED coin symbols in the symbol array 210 in order to win game features associated with three persistent elements 212, 214, 216. Awarding of at least one game feature triggers initiation of a free-spin bonus game.

In the example of FIG. 5, a BLUE COIN is associated with the first persistent element 212, a GOLD coin is associated with the second persistent element 214, and a RED coin is associated with the third persistent element 216. In the examples of FIGS. 4-5, a REPEATING game feature is associated with the first persistent element 212, an EXPLODING game feature is associated with the second persistent element 214, and an ABSORBING game feature is associated with the third persistent element 216. These game features will be described further below.

In FIGS. 4-5, the persistent elements 212, 214 and 216 are represented as triangles. The persistent elements may take forms other than the triangles 212, 214, 216, including for example flasks, coin pots, urns, vases, jars, jugs, cans, bowls, piggy banks, beehives, inflating balloons, ladders, dials, meters, etc. Similarly, the accumulation symbols associated with the persistent elements may take forms other than coins, including, for example, cauldrons, balloons, colored dollar signs, etc. The accumulation symbols may or may not be color-matched to their respective persistent elements, provided their association to a persistent element is indicated. For example, the BLUE coins and the first persistent element 212 may be colored blue, the GOLD coins and the second persistent element 214 may be colored gold, and the RED coins and the third persistent element 216 may be colored red.

At step 304, the game-logic circuitry detects, via a value input device, a physical item associated with a monetary value that establishes a monetary balance in the form of cash or credits. In FIGS. 4-5, the monetary balance may be shown on a meter 200. Values such as jackpot values and floor and ceiling attributes of persistent sliding scale components, discussed below, may be initialized to predetermined values or may carry over from a previous playing session.

Base Game Spin

At step 306, the game-logic circuitry initiates a base game of a wagering game cycle (i.e., spin cycle) in response to an input indicative of a wager covered by the monetary balance. To initiate a spin of the reels, the player may press a "Spin" or "Max Bet" key on a button panel or touch screen. In FIGS. 4-11 the wager may be shown on a bet meter 202.

At step 308, using an RNG, the game-logic circuitry spins and stops the reels to randomly land symbols from the reels in the array in visual association with one or more paylines (also known as lines, ways, patterns, or arrangements). The reel spin may be animated on a video display by depicting symbol-bearing strips moving vertically across the display and synchronously updating the symbols visible on each strip as the strip moves across the display. Alternatively, the reels may be physical/electromechanical reels. FIG. 4 depicts a first base-game spin outcome.

Base Game Win Evaluation

At step 310, the game-logic circuitry evaluates the patterns of symbols landed in the array. Payouts are awarded in accordance with a pay table. The pay table may, for example, include "line pays," "ways pays" and "scatter pays." Line pays occur when a predetermined type and number of symbols appear along an activated payline, typically in a particular order such as left to right, right to left, top to bottom, bottom to top, etc. Ways pays appear on adjacent reels without the requirement to be on a specified pay line or directly adjacent to one another. Scatter pays occur when a predetermined type and number of symbols appear anywhere in the displayed array without regard to position or paylines. Each payline preferably consists of a single symbol position in each column of the array. The number of paylines may be as few as one or as many as possible given each payline consists of a single symbol position in each column of the array. To animate a standard pay, the display may apply a border, pattern, color change, background change, watermark, or other distinguishing characteristic to the winning payline and/or winning symbols that contributed to the pay. FIG. 4, for example, depicts a line pay of three Q symbols in the middle row of the array 210. The awarded pay is added to a win meter 204. FIG. 5 does not illustrate any base game pays, but, instead, is intended to illustrate outcomes related to various attributes of the persistent elements 212-216.

Animation of Persistent Element Growth

At step 312, the game-logic circuitry determines whether or not any accumulation symbols landed in the array. If no accumulation symbols landed in the array, flow continues at step 348, otherwise flow continues to step 314 on FIG. 3B. As mentioned above, in the embodiments described here, accumulation symbols are colored coins, but may take any form.

FIG. 5 illustrates the results of a second base game spin in which accumulation symbols have landed in the array. At step 314, the game-logic circuitry animates, via the one or more presentation devices, an addition of any accumulation symbol in the array to the persistent element associated with the accumulation symbol.

In one or more embodiments, the accumulation symbols may be carried on the reels as "stickers" applied over an underlying standard reel symbol. As part of the animation sequence at step 314, in which each accumulation symbol is transferred to its respective persistent element, the "sticker" is removed from its location in the reel array to reveal a standard reel symbol underneath. In other embodiments, the accumulation symbols may simply be removed from the array and replacement symbols may randomly selected to take their places. Accumulation symbols may also be value-bearing symbols, for example, coins, that may remain in the array and contribute their values to the game's outcome. In other embodiments, non-value-bearing coin symbols may remain in the array as "blocking symbols" that break up other potentially winning combinations of standard symbols. These approaches or combinations thereof all fall within the spirit and scope of the invention.

Figure 6:
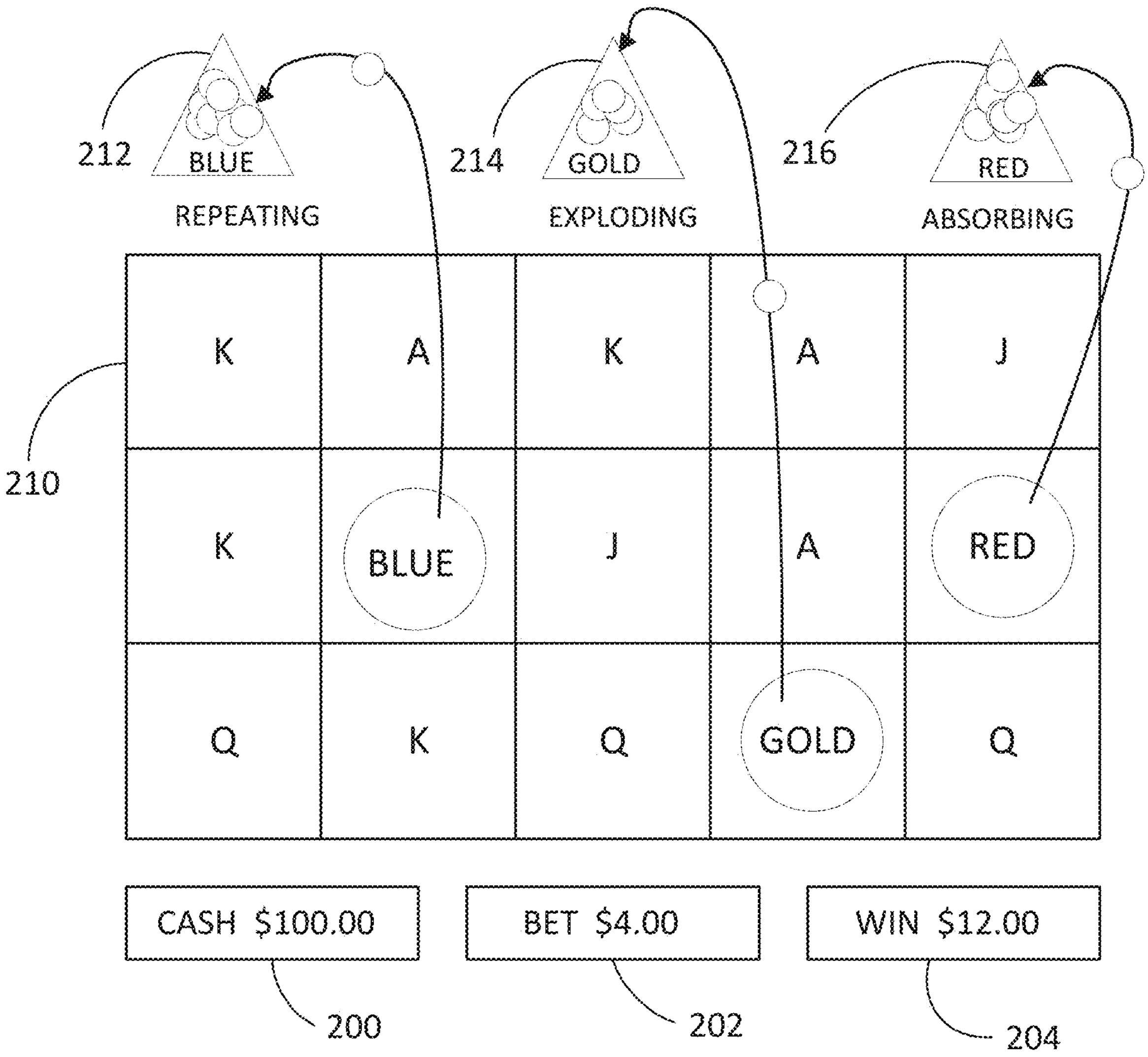

To show the transfer of an accumulation symbol to a persistent element, the accumulation symbol may be animated to "fly" from the array to land in its associated persistent element. In FIG. 6, in an example of a third base game spin resulting in accumulation symbols landing in the array, each transfer of an accumulation symbol to the persistent elements 212, 214, 216 is represented by a circle and an arrow. See, for example, the arrow from the BLUE symbol in the second column of the array 210, the arrow from the GOLD symbol in the fourth column of the array 210, and the arrow from the RED symbol in the fifth column of the array 210 in FIG. 5.

To represent the gradual addition to the persistent element, the persistent element and/or the volume of symbols therein may appear to grow in size. In accordance with some embodiments, the persistent element may be an object of fixed size accompanied by some other indication of accumulating value, for example, by a gradual change in color shading, for example, from light red to dark red. In other embodiments, the persistent element may change size and also show some other indication of increasing value, for example, the color of the display in the immediate area of the persistent element may gradually change as its value increases. The size of a persistent element may or may not indicate the likelihood that its associated game feature will be triggered. This will be discussed further below.

Though not shown in FIG. 5 or FIG. 6, no accumulation symbols, a single accumulation symbol colors or multiple accumulations symbols of the same color/type may appear in the array at the same time. Animation representing the transfer each accumulation symbol from the array 210 to its respective persistent element may be presented sequentially or in parallel.

Perceived Persistence

During a player's gaming session, the growth in size of the persistent elements 212, 214 and 216 persists from one wagering game cycle to the next such that the player perceives that a bonus game awarding the game feature corresponding to a particular persistent element may be getting closer to being triggered. When the size of the persistent elements has no bearing on whether the bonus game will be triggered and, if it is, whether the associated game features will actually be awarded, this is known as "perceived persistence." When a game feature associated with a persistent element is awarded, at least some of the contents of the persistent element are visually removed and the accumulation of value in that persistent element during subsequent game spin cycles resumes from that point. In this example, each of the persistent elements 212, 214 and 216 exhibit perceived persistence. In other embodiments, the displayed size of a persistent element may exhibit "true persistence" and fully or partially represent the likelihood that its associated game feature will be triggered.

Game Feature Triggering

Whether to award the BLUE, GOLD or RED game features is a random determination independent of any prior wagering game cycles. In accordance with one or more embodiments, the odds of triggering each game feature may increase according to the number of matching accumulation symbols appearing in the array. This may be accomplished, for example, by changing weights associated with the random determination. In other embodiments, the appearance of multiple same-type (i.e., color) accumulation symbols in the array has no effect on the probability of awarding the corresponding game feature.

At step 316, if at least one BLUE accumulation symbol associated with the first persistent element 212 was detected in the array at step 312, the game logic circuitry may or may not award the game feature associated with the first persistent element 212. If not awarded, the game-logic circuitry continues the flow at step 320. Otherwise, the game feature is awarded at step 320.

Figure 7:
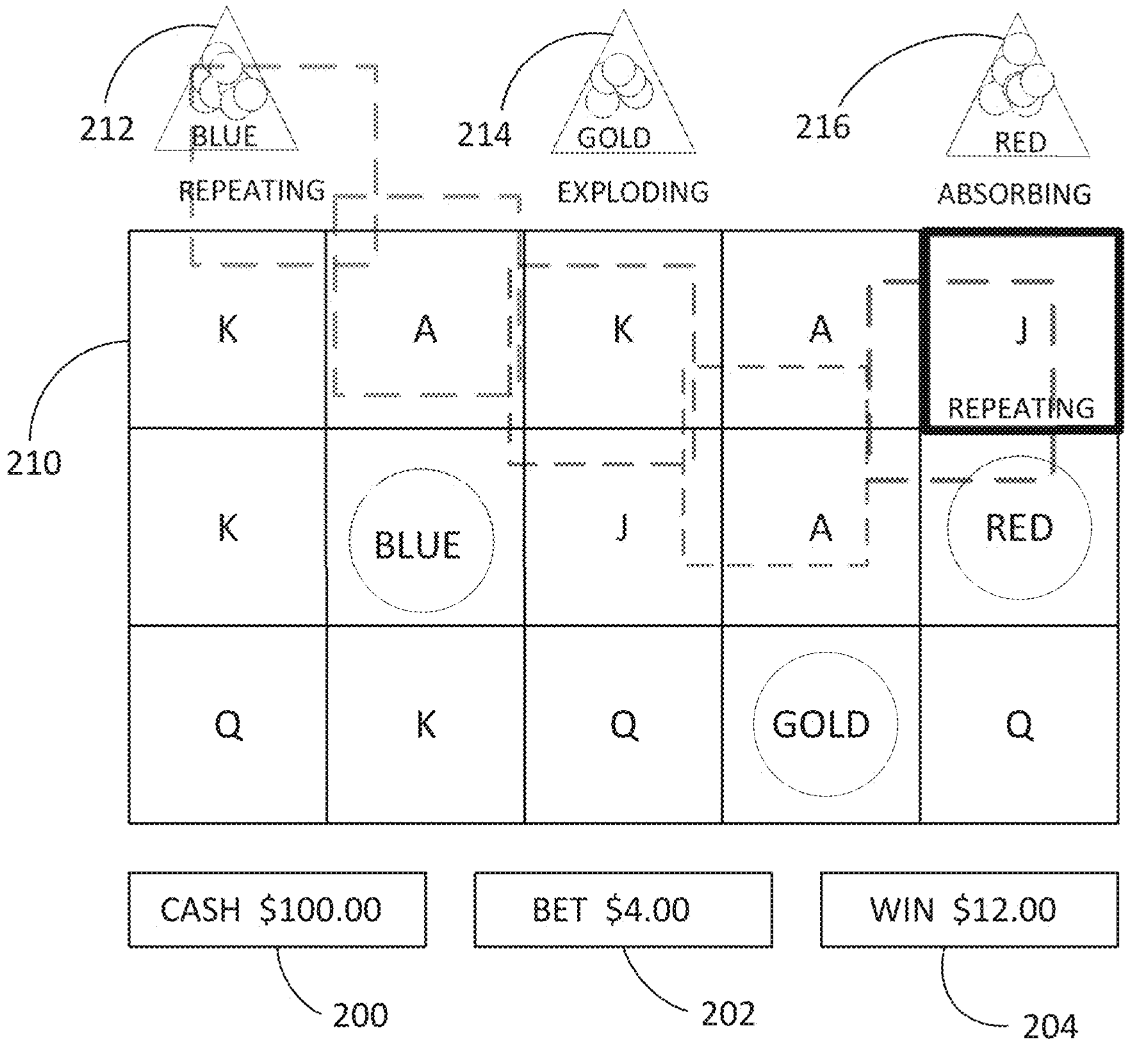
FIG. 7 is an exemplary presentation of awarding a game feature resulting from the flow diagram of FIG. 3B in accordance with one or more embodiments.

At step 320, the game feature associated with the first persistent element 212 is awarded by designating one or more array positions as BLUE array positions. To show the designation of an array location, a frame may be animated to "fly" from the BLUE persistent element 212 to land at the designated position. In FIG. 7, an example of a single BLUE frame being distributed from the first persistent element 212 to its respective designated location at the top right corner of array 210 is illustrated with intermediate positions of the frame during the animation designated by dashed borders. In the example shown, the game feature associated with the first persistent element 212 is "REPEATING." A REPEATING label at the designated location indicates that this position in the array has been designated to apply rules associated with the BLUE game feature during an upcoming bonus game, to be described below.

Preferably, though not illustrated in the example of FIG. 7 for the sake of clarity, when the game feature is awarded at step 316, several frames are animatedly distributed from the persistent element 212 to positions within the array, the number of frames and their locations determined via the RNG.

Once the "REPEATING" game feature has been awarded at step 316, the game logic circuitry proceeds to step 320.

At step 320, if at least one GOLD accumulation symbol associated with the second persistent element 214 was detected in the array at step 312, again, the game logic circuitry may or may not award the game feature associated with the second persistent element 214. If not awarded, the game-logic circuitry continues the flow at step 324. Otherwise, the GOLD game feature is awarded at step 322.

At step 322, the game feature associated with the second persistent element 214 is awarded by designating one or more array positions as GOLD array positions. As above with awarding of the BLUE game feature (FIG. 7), to show the designation of an array location, a frame may be animated to "fly" from the GOLD persistent element 214 to land at the designated position. The game feature associated with the second persistent element 214 is "EXPLODING." Thus, an EXPLODING label may be displayed at the designated location to indicate that this position in the array has been designated to apply rules associated with the GOLD game feature during the upcoming bonus game. Also as above, when the GOLD game feature is awarded at step 316, preferably several frames are animatedly distributed from the GOLD persistent element 214 to positions within the array, the number of frames and their locations determined via the RNG. Once the "EXPLODING" game feature has been awarded at step 322, the game logic circuitry proceeds to step 324.

At step 324, if at least one RED accumulation symbol associated with the third persistent element 216 was detected in the array at step 312, the game logic circuitry may or may not award the game feature associated with the third persistent element 216. If not awarded, the game-logic circuitry continues the flow at step 328 of FIG. 3C. Otherwise, the RED game feature is awarded at step 326.

At step 326, the game feature associated with the third persistent element 216 is awarded by designating one or more array positions as RED array positions. As above with awarding of the BLUE game feature (FIG. 7), to show the designation of an array location, a frame may be animated to "fly" from the RED persistent element 216 to land at the designated position. The game feature associated with the third persistent element 216 is "ABSORBING." Thus, an ABSORBING label may be displayed at the designated location to indicate that this position in the array has been designated to apply rules associated with the RED game feature during the upcoming bonus game. Also as above, when the RED game feature is awarded at step 326, preferably several frames are animatedly distributed from the RED persistent element 216 to positions within the array, the number of frames and their locations determined via the RNG. Once the "ABSORBING" game feature has been awarded at step 326, the game logic circuitry proceeds to step 328 of FIG. 3C.

At step 328, the game-logic circuitry determines if at least one game feature was awarded in steps 316-326. If no game features were awarded, the game-logic circuitry returns to step FIG. 3A, step 346. If, however, at least one game feature was awarded, the game-logic circuitry instead continues at step 330.

Playing the Bonus Game

At step 330, once one or more game features have been awarded at one or more of steps 318, 322 and 326, the bonus game is initialized. For example, the game-logic circuitry may control the one or more presentation devices (e.g., mechanical-reel display device, video display device, or a combination thereof) to present a bonus games array comprising the designated array positions described above with any remaining positions in the array considered non-designated positions. Special bonus reels may be populated with a different distribution of value-bearing, otherwise known as WYSIWYG ("What You See is What You Get") or "cash on reels" symbols, and standard symbols from the base game reels. Each value-bearing symbol is associated with a credit or currency value indicated on the symbol itself. The value on a particular credit-bearing symbol may be variable (e.g., random) from one game cycle to the next. Different value-bearing symbols on the reels may have different values.

The bonus game is presented as a "hold and spin" game in which any value-bearing symbols that land in the array during the bonus game are held in place for all subsequent bonus game spins. Thus, after the first bonus game spin, only positions in the array not occupied by a value-bearing symbol are eligible to receive a new symbol from the reels as a result of the spin, Also, at step 330, a free spins counter may be initialized to a particular value, for example, three free spins. The spin counter decrements after each bonus spin. If no value-bearing symbol lands in the array in three successive bonus spins, at which point the free spin counter is zero, the bonus game terminates. However, in some embodiments, if a value-bearing symbol is newly landed in the array as a result of a bonus spin, the free spin counter may be reset to its initial value, for example, three free spins. In alternate embodiments, the free spin counter may be initialized to a larger fixed amount, for example, five free spins, with no opportunity to reset the free spin counter. In still embodiments, a free spin counter may not be used. For example, the duration of the bonus game may be timed.

In this example, the bonus game includes a free spins counter. At step 332, the free spins counter is checked to see if any free spins remain. If not, the bonus game is terminated and flow proceeds to step 346. Otherwise, flow continues at step 334.

At step 334, using the RNG, the game-logic circuitry performs a bonus spin by spinning and stopping the reels to randomly land symbols from the bonus reels in the array. The reel spin may be animated on a video display by depicting symbol-bearing strips moving vertically across the display and synchronously updating the symbols visible on each strip as the strip moves across the display. Alternatively, the reels may be physical/electromechanical reels.

Figure 8:
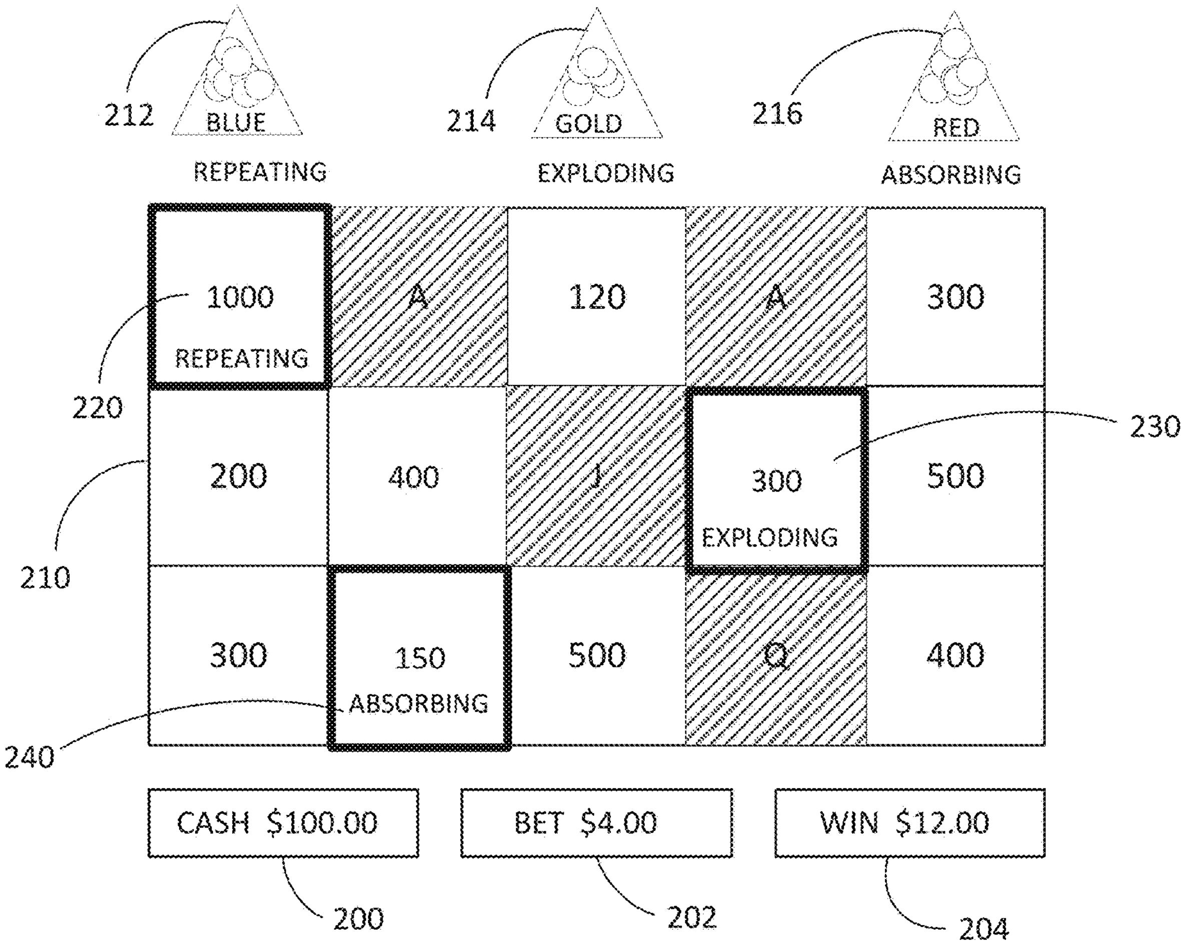
FIGS. 8-10 are exemplary presentations of stages of a bonus game spin outcome resulting from the flow diagram in FIG. 3B in accordance with one or more embodiments.

FIG. 8 depicts a first bonus game spin outcome. In the example of FIG. 8, all of the BLUE, GOLD and RED game features were previously awarded, as described above. The bonus reels have been populated with a mix of value-bearing symbols and standard symbols, with a heavy emphasis on value-bearing symbols. In the bonus game, the standard symbols are not associated with any winning outcomes and, instead, represent losing positions within the array. Thus, the standard symbols may be represented as "greyed out," as indicated by the shaded locations in array 210.

As previously noted, awarding each game feature would typically designate multiple array locations as associated with the respective game feature. For the sake of clarity, with the understanding that multiple array locations could have been designated by the awarding of each of the game features, a single location 220 was designated at step 318 as associated with the BLUE game feature (REPEATING). Similarly, a single location 230 was designated at step 322 as associated with the GOLD game feature (EXPLODING) and a single location 240 was designated at step 326 as associated with the RED game feature (ABSORBING).

Also not shown for the sake of clarity, each position in the array may be designated as being associated with more than one of the game features. For example, a position may be designated as both an EXPLODING and an ABSORBING location. As will be seen below, if a value-bearing symbol lands in such a location, all applicable rules will be applied in the order specified by the game designer. In the exemplar flow of FIG. 3C, the value will first “explode” to other locations in the array, then the symbol in the designated location will “absorb” the values of all other value-bearing symbols in the array. The dual designations for the location will then be removed from the location. All combinations of one, two or three designations per location and all possible orders of rule processing fall within the spirit and scope of the invention.

At step 334, the game-logic circuitry determines whether any value-bearing symbols landed in array positions designated as associated with the BLUE game feature. Because, in FIG. 8, a value-bearing symbol (1000) landed in the location 220 designated as associated with the BLUE feature, the game rules associated with the REPEATING game feature are applied to the landed value-bearing symbol at step 336. In this case, the value-bearing symbol is held in place for each of the remaining free spins of the bonus game and the original value borne by the symbol will be added to itself each spin. For example, at the end of the spin shown, the value of 1000 is assigned to the value-bearing symbol held at location 220. At the end of the second spin, an additional 1000 will be added to the original 1000 for a new value of 2000. At the end of the third free spin, the 2000 value will increase to 3000, and so on.

Figure 9:
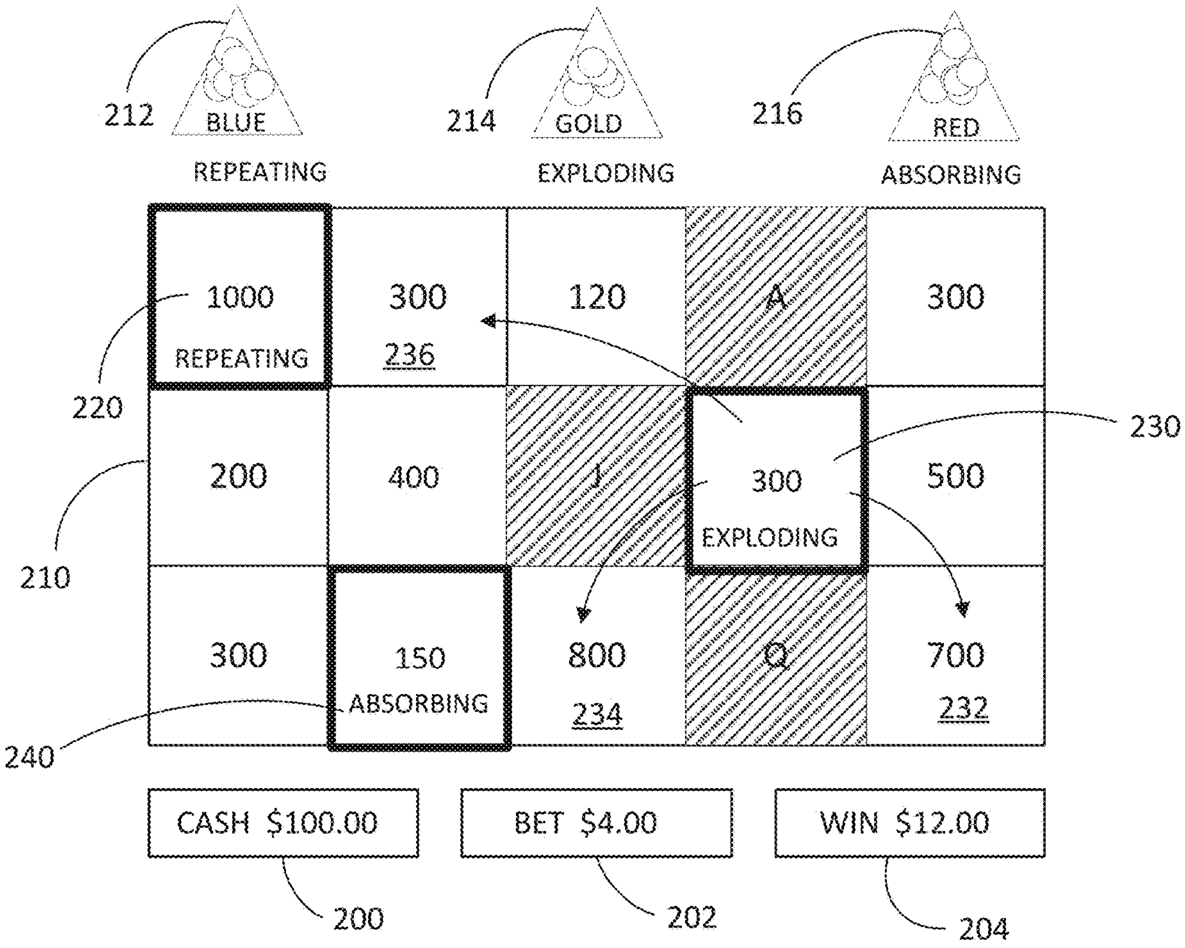

At step 338, the game-logic circuitry determines whether any value-bearing symbols landed in array positions designated as associated with the GOLD game feature. Because, in FIG. 8, a value-bearing symbol (300) landed in the location 230 designated as associated with the GOLD feature, the game rules associated with the EXPLODING game feature are applied to the landed value-bearing symbol at step 340. In this case, the value-bearing symbol at location is held in place for each of the remaining free spins of the bonus game and the original value borne by the symbol will be added to other randomly determined locations in the array. For example, at the end of the spin shown in FIG. 8, the value of 300 is assigned to the value-bearing symbol held at location 230. In addition, the value-bearing symbol “explodes” into two other locations 232 and 234, as illustrated by FIG. 9. In this case, the original value at location 232 (400 in FIG. 8) is increased by the value 300 borne by the symbol at the designated location 230. Likewise, the original value at location 234 (500 in FIG. 8) is increased by the value 300 borne by the symbol at the designated location 230. Finally, the standard symbol at location 236 (A in FIG. 8) is replaced by a value-bearing symbol bearing the value 300 according to the value 300 borne by the symbol at the designated location 230. Once the rules are applied, the frame designating location 232 as associated with the GOLD feature is removed and location 230 simply contains the value bearing symbol.

Figure 10:
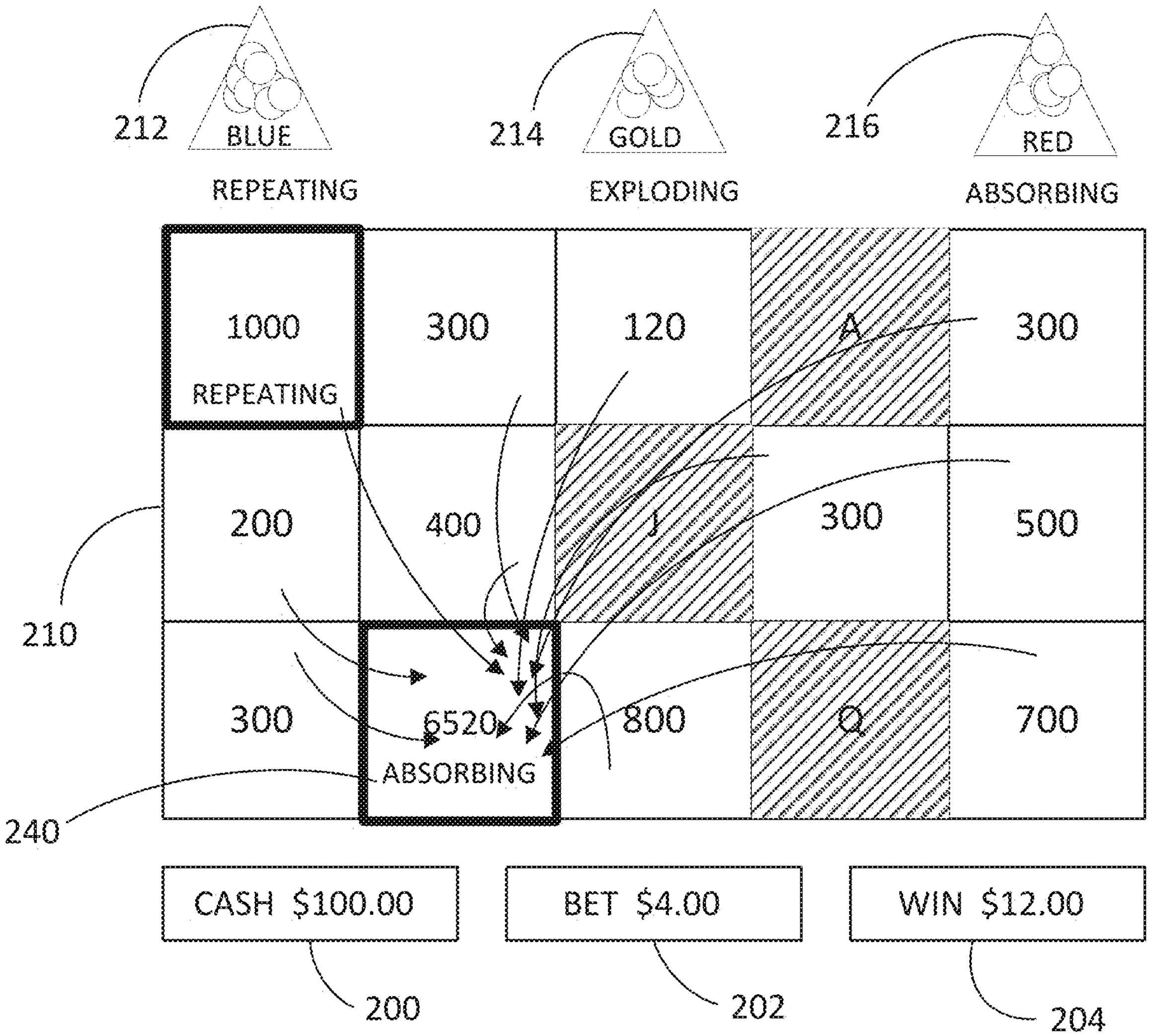

At step 342, the game-logic circuitry determines whether any value-bearing symbols landed in array positions designated as associated with the RED game feature. Because, in FIG. 8, a value-bearing symbol (150) landed in the location 240 designated as associated with the RED feature, the game rules associated with the ABSORBING game feature are applied to the landed value-bearing symbol at step 344. In this case, the value-bearing symbol at the designated location 240 is held in place for each of the remaining free spins of the bonus game and the values borne by any value-bearing symbols in the array will be added to the value originally borne by the symbol at location 240. For example, at the end of the spin shown in FIG. 8, the value of 150 is assigned to the value-bearing symbol held at location 240. As illustrated by FIG. 10, the values of all other value-bearing symbols in the array after the application of the BLUE and GOLD feature rules are added to the 150 value originally assigned to the symbol at location 240. The addition of each value-bearing symbol to location 240 may be animated, for example, a copy of each value may appear to float (indicated by arrows on FIG. 10) from its origin to location 240 before being added to the current value borne by the symbol at location 240. In the example of FIG. 10, the original value of 150 increased by 1000+300+120+300+200+400+300+500+300+800+700 for a new value of 6520. Once the “absorbing” rules have been completely applied to the symbol at location 240, the frame designating location 240 as associated with the RED feature is removed and location 240 simply contains the value bearing symbol bearing its new value and held in place for the remainder of the free spins.

In some embodiments, the above order of evaluation for the application of the game feature rules may vary. In the above example, the REPEATING rules, if applicable, are applied first, the EXPLODING rules, if applicable, are applied second and the ABSORBING rules, if applicable, are applied third. In an alternate embodiment, the order is reversed. In this case, because application of the ABSORBING rule does not have the benefit of additional value-bearing symbols provided by the EXPLODING rule or the benefit of an increased value in each REPEATING location, the expected value (EV) of each bonus spin would be less than in the first example. The game designer, thus, is provided options to control the EV of the bonus game.

Bonus Game Continuation/Termination

At step 332, as indicated above, the game-logic circuitry determines whether any additional bonus spins remain. If, at step 332, the spin counter is not decremented to zero, flow continues to step 334 for another free spin, as described above. Otherwise, flow continues to step 346, where the final values of all value-bearing symbols are totaled and awarded. The awarded pay is added to win meter 204 and the monetary meter 200. Flow then continues to step 348 of FIG. 3A.

At step 348, the game-logic circuitry determines whether or not it has received a cashout input via at least one of the one or more player input devices of the gaming machine. If it has not received a cashout input, the game-logic circuitry waits for the next wager input at step 306. If it has received a cashout input, the game-logic circuitry initiates a payout from the monetary balance on the meter 200. The data processing method then ends at step 350.

The recitations of a value input device for establishing a credit balance, an input device for accepting a wager input that initiates a spin, and a value output device for paying out the credit balance are integrally incorporated within the steps of the data processing method. For example, the presentation of game outcomes through the spinning and stopping of the reels is essential to the game outcome determinations, which may only be initiated by the accepted wager input. Furthermore, a value input device for establishing a credit balance, an input device for accepting a wager that initiates a spin, and a value output device for paying out the credit balance are physical, structural elements that are not shared by generic or well-known computing devices but, rather, are particular to gaming machines.

Embodiments of the present invention realize benefits in increased computer processing efficiency with minimized processing overhead, fewer rules to be evaluated, fewer player inputs to be monitored, and simpler graphical representations. With respect to the game feature triggering process, if no coin symbol appears in the array at step 312, the game-logic circuitry foregoes any random determination of whether a game feature will be awarded. Furthermore, if any coin symbols do appear in the array, regardless of the number of persistent elements and associated game features that may be won in parallel, in some embodiments, only a single invocation of the RNG at an additional step between steps 314 and step 316 may be used to determine whether any game feature will actually be triggered and, only if that outcome is true, will steps 316, 320 and 324 be performed. In contrast, in typical prior art systems with mystery bonus triggers, the game-logic circuitry makes a random determination in each and every wagering game cycle and for each and every game feature that may be won, thereby reducing processing efficiency compared to the method presented herein. Furthermore, use of a sliding range from which values are randomly selected provides multiple outcome paths with only one additional RNG call, rather than predefining an exhaustive list of possible scenarios in configuration files, memory, etc.

In this description, numerous specific details are set forth. However, it is understood that embodiments of the invention may be practiced without these specific details.

Some embodiments of the present invention comprise an innovative application of data processing steps that, when implemented by game-logic circuitry, direct a presentation assembly to present a process that minimizes processing overhead by utilizing numbered indicia to represent credit values instead of complex, fanciful game images. In this way, the value-bearing symbols require fewer rules needed for the award process than would be necessary for calculating values of winning symbol combinations enumerated in stored paytables, as found in more complex reel-spinning routines. At the same time, embodiments of the present invention provide a straightforward, what-you-see-is-what-you-get (WYSIWYG) visual presentation that is simple to understand and, therefore, effective in generating player excitement and enthusiasm. The result is a highly flexible value-award process that can be easily adapted to any theme/brand while remaining easily understood by players.

In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim, as may be amended, constitutes an embodiment of the invention, incorporated by reference into the detailed description. Moreover, in this description, the phrase "exemplary embodiment" means that the embodiment being referred to serves as an example or illustration.

Block diagrams illustrate exemplary embodiments of the invention. Flow diagrams illustrate operations of the exemplary embodiments of the invention. The operations of the flow diagrams are described with reference to the example embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Additionally, some embodiments may not perform all the operations shown in a flow diagram. Moreover, it should be understood that although the flow diagrams depict serial operations, certain embodiments could perform certain of those operations in parallel or in a different sequence.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A method of operating a gaming machine, the gaming machine including game-logic circuitry, a presentation assembly, a first memory storing an authentication program and a trusted authentication code, and a second memory storing game-execution code and programming for a random number generator (RNG) configured to cycle continuously in the background between play cycles and during play cycles at a speed that cannot be timed by a player, the method comprising the operations of:

executing, by the authentication program, authentication of the game-execution code and the RNG programming stored in the second memory by generating a live authentication code based on contents of the second memory and comparing the live authentication code to the trusted authentication code stored in the first memory, and permitting execution of the game-execution code only when the comparing indicates a match;

in response to the permitting, conducting, by the game-logic circuitry executing the game-execution code, a base game including:

presenting, by the presentation assembly, a meter, a base array, a plurality of symbol-bearing base reels, and a plurality of persistent elements, each persistent element having an associated game feature and an associated accumulation symbol;

maintaining, in at least one of the first memory or the second memory, a persistent-element state record indicative of an accumulation state of each persistent element of the plurality of persistent elements, the persistent-element state record being maintained across play cycles;

conducting a base game spin of the base reels, using the RNG, to land symbols from the base reels in the base array; and if the landed symbols do not include any accumulation symbol, foregoing any random determination of whether or not to award a game feature; and in response to the landed symbols including a first accumulation symbol:

animating an addition of the first accumulation symbol to its associated first persistent element; and updating the persistent-element state record to reflect the addition of the first accumulation symbol to the associated first persistent element; and randomly determining, using the RNG, whether or not to award a first game feature associated with the first persistent element; and in response to awarding the first game feature:

animating designation of at least one location within the bonusthe base array as associated with the first game feature;

implementing the first game feature via the game-logic circuitry, wherein the implementing comprises:

conducting one of more bonus spins of a plurality of bonus reels, comprising value-bearing symbols, to land symbols from the bonus reels in thethe base array; and for each bonus spin, in response to a value-bearing symbol bearing an initial value landing in a location designated as associated with the first game feature, applying rules associated with the first game feature to one or more of the remaining landed symbols.

2. The method of claim 1, further comprising holding in place all value-bearing symbols that land in the array for the remainder of the bonus spins, wherein each subsequent bonus spin lands symbols from the bonus reels only in locations not occupied by value-bearing symbols.

3. The method of claim 2, wherein, further comprising, in response to conclusion of the bonus spins, incrementing the meter by an amount based on a total of the values borne by all value-bearing symbols held in place in the array.

4. The method of claim 1, wherein the rules comprise holding the value-bearing symbol in the location designated as associated with the first game feature in place in the array for each of the remaining bonus spins and increasing the value borne by the value-bearing symbol in that location by an amount based on the initial value is response to each subsequent spin.

5. The method of claim 1, wherein the rules comprise increasing a value borne by at least one other value-bearing symbol in the array by an amount based on the initial value.

6. The method of claim 1, wherein the rules comprise increasing the value borne by the value-bearing symbol in the location designated as associated with the first game feature by an amount based on a value borne by at least one other value-bearing symbol in the array.

7. The method of claim 1, further comprising, in response to applying the rules associated with the first game feature, removing the designation of the at least one location within the base array as associated with the first game feature.

8. The method of claim 1, further comprising, in response to the landed symbols including a second accumulation symbol:

animating an addition of the second accumulation symbol to its associated second persistent element; and randomly determining whether or not to award a second game feature associated with the second persistent element; and in response to awarding the second game feature:

animating designation of at least one location within the base array as associated with the second awarded game feature; and implementing the second game feature via the game-logic circuitry, wherein the implementing comprises:

for each bonus spin, in response to a value-bearing symbol landing in a location designated as associated with the second game feature, applying rules associated with the second game feature to one or more of the remaining landed symbols.

9. The method of claim 8, wherein at least one location designated as associated with the first game feature and at least one location designated as associated with the second game feature comprise a same location.

10. The method of claim 1, wherein randomly determining whether or not to award the game features associated with the persistent elements is, at least in part, based on the size of the persistent element or the volume of items therein.

11. A gaming machine comprising:

a presentation assembly;

a first memory storing an authentication program and a trusted authentication code;

a second memory storing game-execution code and programming for a random number generator (RNG) configured to cycle continuously in the background between play cycles and during play cycles at a speed that cannot be timed by a player; and game-logic circuitry configured to perform the operations of:

executing the authentication program to generate a live authentication code based on contents of the second memory, comparing the live authentication code to the trusted authentication code stored in the first memory, and permitting execution of the game-execution code only when the comparing indicates a match;

in response to the permitting, conducting a base game including:

presenting, by the presentation assembly, a meter, a plurality of symbol-bearing base reels, a base array, and a plurality of persistent elements, each persistent element having an associated game feature and an associated accumulation symbol;

maintaining, in at least one of the first memory or the second memory, a persistent-element state record indicative of an accumulation state of each persistent element of the plurality of persistent elements, the persistent-element state record being maintained across play cycles:

conducting a base game spin of the base reels, using the RNG, to land symbols from the base reels in the base array; and if the landed symbols do not include any accumulation symbol, foregoing any random determination of whether or not to award a game feature; and in response to the landed symbols including the first accumulation symbol:

animating an addition of the first accumulation symbol to its associated first persistent element; and updating the persistent-element state record to reflect the addition of the first accumulation symbol to the associated first persistent element; and randomly determining, using the RNG, whether or not to award a first game feature associated with the first persistent element; and in response to awarding the first game feature:

animating designation of at least one location within the base array as associated with the first game feature;

implementing the first game feature, wherein the implementing comprises:

conducting one of more bonus spins of a plurality of bonus reels, comprising value-bearing symbols, to land symbols from the bonus reels in the base array; and for each bonus spin, in response to a value-bearing symbol bearing an initial value landing in a location designated as associated with the first game feature, applying rules associated with the first game feature to one or more of the remaining landed symbols.

12. The gaming machine of claim 11, wherein the game-logic circuitry is configured to perform the operation of holding in place all value-bearing symbols that land in the array for the remainder of the bonus spins, wherein each subsequent bonus spin lands symbols from the bonus reels only in locations not occupied by value-bearing symbols.

13. The gaming machine of claim 12, wherein the game-logic circuitry is further configured to perform the operation of, in response to conclusion of the bonus spins, incrementing the meter by an amount based on a total of the values borne by all value-bearing symbols held in place in the array.

14. The gaming machine of claim 11, wherein the rules comprise holding the value-bearing symbol in the location designated as associated with the first game feature in place in the array for each of the remaining bonus spins and increasing the value borne by the value-bearing symbol in that location by an amount based on the initial value is response to each subsequent spin.

15. The gaming machine of claim 11, wherein the rules comprise increasing a value borne by at least one other value-bearing symbol in the array by an amount based on the initial value.

16. The gaming machine of claim 11, wherein the rules comprise increasing the value borne by the value-bearing symbol in the location designated as associated with the first game feature by an amount based on a value borne by at least one other value-bearing symbol in the array.

17. The gaming machine of claim 11, wherein the game-logic circuitry is configured, in response to applying the rules associated with the first game feature, to perform the operation of removing the designation of the at least one location within the base array as associated with the first game feature.

18. The gaming machine of claim 11, wherein the game-logic circuitry is further configured to perform the operations of:

in response to the landed symbols including a second accumulation symbol:

animating an addition of the second accumulation symbol to its associated second persistent element; and randomly determining whether or not to award a second game feature associated with the second persistent element; and in response to awarding the second game feature:

animating designation of at least one location within the base array as associated with the second awarded game feature; and implementing the second game feature via the game-logic circuitry, wherein the implementing comprises:

for each bonus spin, in response to a value-bearing symbol landing in a location designated as associated with the second game feature, applying rules associated with the second game feature to one or more of the remaining landed symbols.

19. The gaming machine of claim 18, wherein at least one location designated as associated with the first game feature and at least one location designated as associated with the second game feature comprise a same location.

20. The gaming machine of claim 11, wherein randomly determining whether or not to award the game features associated with the persistent elements is, at least in part, based on the size of the persistent element or the volume of items therein.

* * * * *